United States Patent
Valsler et al.

(10) Patent No.: US 10,179,305 B2
(45) Date of Patent: Jan. 15, 2019

(54) AIR INTAKE SEPARATOR SYSTEMS AND METHODS

(71) Applicant: Veotec Americas LLC, Burnsville, MN (US)

(72) Inventors: Peter Valsler, Apple Valley, MN (US); Michael Handley, Farmington, MN (US); Philip Pendrill, Whitehill (GB); Andrew Russell, Sutton Coldfield (GB)

(73) Assignee: Veotec Americas LLC, Burnsville, MN (US)

( * ) Notice: Subject to any disclaimer, the term of this patent is extended or adjusted under 35 U.S.C. 154(b) by 52 days.

(21) Appl. No.: 14/664,149

(22) Filed: Mar. 20, 2015

(65) Prior Publication Data

US 2015/0266145 A1    Sep. 24, 2015

Related U.S. Application Data

(60) Provisional application No. 61/968,627, filed on Mar. 21, 2014.

(51) Int. Cl.
*B01D 45/00* (2006.01)
*B01D 45/08* (2006.01)
(Continued)

(52) U.S. Cl.
CPC ............ *B01D 45/08* (2013.01); *B01D 45/06* (2013.01); *B01D 45/16* (2013.01); *B01D 50/002* (2013.01);
(Continued)

(58) Field of Classification Search
CPC ....... F04C 13/005; F04C 15/06; F04C 13/008; F04C 3/085; F04C 11/001; F04C 2/107;
(Continued)

(56) References Cited

U.S. PATENT DOCUMENTS

| | | | | | |
|---|---|---|---|---|---|
| 2,643,736 | A | * | 6/1953 | Smith | B01D 45/08 55/440 |
| 3,490,210 | A | * | 1/1970 | Dixon | B01D 45/08 55/440 |

(Continued)

FOREIGN PATENT DOCUMENTS

| | | |
|---|---|---|
| CN | 201711047 U | 1/2011 |
| GB | 2512878 A | 10/2014 |

OTHER PUBLICATIONS

International Preliminary Report on Patentability, International Application No. PCT/US2015/021791, mailed Sep. 29, 2016, 11 pages.
(Continued)

*Primary Examiner* — Dung H Bui
(74) *Attorney, Agent, or Firm* — Patterson Thuente Pederson, P.A.

(57) ABSTRACT

An air intake separator system includes a plurality of vanes adapted to remove fluid or precipitation from an air stream, wherein the vanes are operably coupled to tubular rods with an interference fit. Applying an elevated temperature heat transfer fluid to the plurality of vanes removes fluid or precipitation from an air stream in order to prevent ice formation. Likewise, applying a lower temperature heat transfer fluid can cool the vanes.

6 Claims, 24 Drawing Sheets

(51) Int. Cl.
*B01D 45/06* (2006.01)
*B01D 45/16* (2006.01)
*B01D 50/00* (2006.01)
*B21D 39/06* (2006.01)
*B21D 53/08* (2006.01)
*F04C 13/00* (2006.01)
*F04C 3/08* (2006.01)
*B01D 21/00* (2006.01)

(52) U.S. Cl.
CPC .......... *B21D 39/06* (2013.01); *B21D 53/085* (2013.01); *B01D 21/0018* (2013.01); *F04C 3/085* (2013.01); *F04C 13/005* (2013.01); *Y10T 29/49396* (2015.01)

(58) Field of Classification Search
CPC ...... F04C 13/001; F04C 2210/24; F04C 2/16; F04C 2240/806; F04C 13/007; B01D 21/34; B01D 21/0018; B01D 21/2494; B01D 45/08; B01D 45/06; B01D 45/16; B01D 50/002; F04B 3/00; F04B 15/00; F28F 1/32; Y10T 29/4938; Y10T 29/49375; F28D 1/05383
See application file for complete search history.

(56) References Cited

U.S. PATENT DOCUMENTS

| | | | | |
|---|---|---|---|---|
| 3,517,486 A * | 6/1970 | Golden | ................ | B01D 45/08 55/394 |
| 3,813,855 A | 6/1974 | Hill | | |
| 3,912,471 A | 10/1975 | Cotton | | |
| 4,365,667 A | 12/1982 | Hatada | | |
| 4,557,740 A | 12/1985 | Smith | | |
| 4,645,119 A * | 2/1987 | Haramaki | ............ | B23K 1/0012 148/24 |
| 4,649,492 A | 3/1987 | Sinha | | |
| 4,738,309 A * | 4/1988 | Schilling | ................ | F28D 7/08 165/101 |
| 5,378,253 A * | 1/1995 | Daum | .................... | B01D 45/08 122/4 D |
| 5,765,284 A | 6/1998 | Ali | | |
| 6,083,302 A * | 7/2000 | Bauver, II | ............. | B01D 45/08 55/440 |
| 6,173,763 B1 | 1/2001 | Sano | | |
| 6,385,987 B2 | 5/2002 | Schlom | | |
| 6,454,824 B1 * | 9/2002 | Maryamchik | .......... | B01D 45/08 110/216 |
| 6,460,372 B1 * | 10/2002 | Fung | .................... | A47F 3/0469 165/150 |
| 6,598,295 B1 * | 7/2003 | Utter | ................... | B21D 53/085 165/151 |
| 6,770,121 B1 * | 8/2004 | Sindel | .................... | B01D 45/08 55/435 |
| 6,852,146 B2 | 2/2005 | Holmes | | |
| 7,028,764 B2 | 4/2006 | Reagen | | |
| 7,251,926 B2 | 8/2007 | Shibata | | |
| 8,728,189 B2 * | 5/2014 | Prasser | .................. | B01D 45/08 165/158 |
| 8,852,307 B2 * | 10/2014 | Sikkenga | ............... | B01D 45/08 55/434.2 |
| 2004/0007132 A1 * | 1/2004 | Holmes | ................. | B01D 45/08 95/272 |
| 2005/0061494 A1 | 3/2005 | Tsuji | | |
| 2009/0025223 A1 * | 1/2009 | Campbell | ................ | F28F 1/32 29/890.03 |
| 2009/0056927 A1 | 3/2009 | Zobel | | |
| 2010/0107675 A1 | 5/2010 | Lifson | | |
| 2010/0199619 A1 * | 8/2010 | Buzanowski | .......... | B01D 45/06 55/443 |
| 2010/0326026 A1 * | 12/2010 | Bratton | ................. | B01D 45/08 55/440 |
| 2011/0030932 A1 | 2/2011 | Tucker | | |
| 2012/0037342 A1 | 2/2012 | Holloway | | |
| 2012/0048113 A1 * | 3/2012 | Anderson | ............ | F04C 13/008 95/254 |
| 2015/0135661 A1 * | 5/2015 | MacDonald | .......... | F24F 13/082 55/440 |
| 2015/0308338 A1 * | 10/2015 | Hao | ....................... | F28F 17/00 165/120 |

OTHER PUBLICATIONS

International Search Report, Application No. PCT/US2015/021791, mailed Jun. 30, 2015, 14 pages.

* cited by examiner

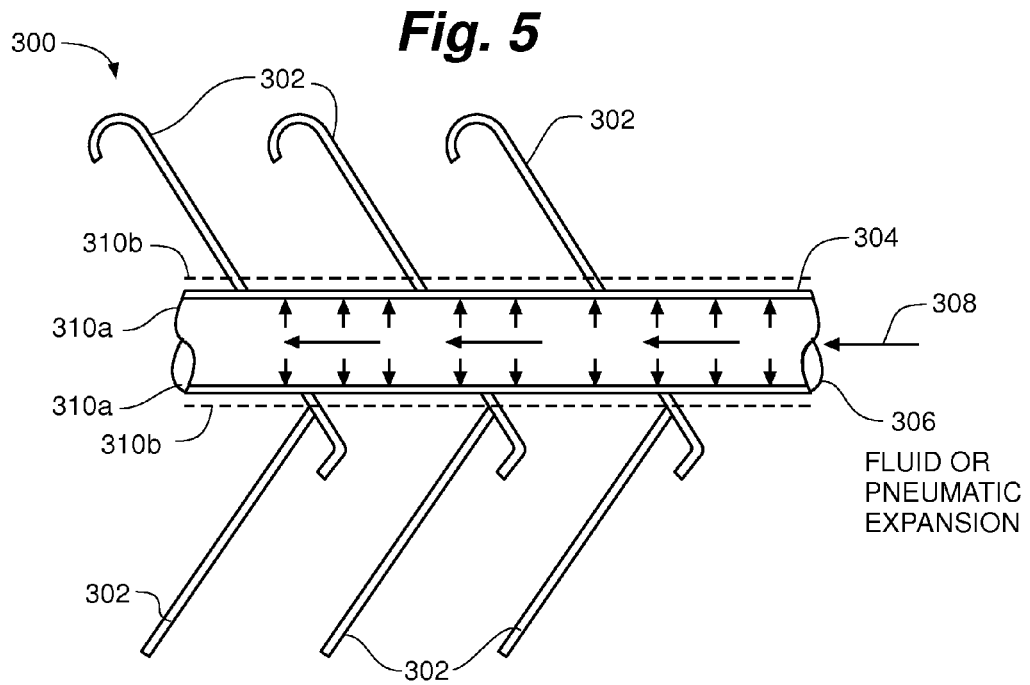
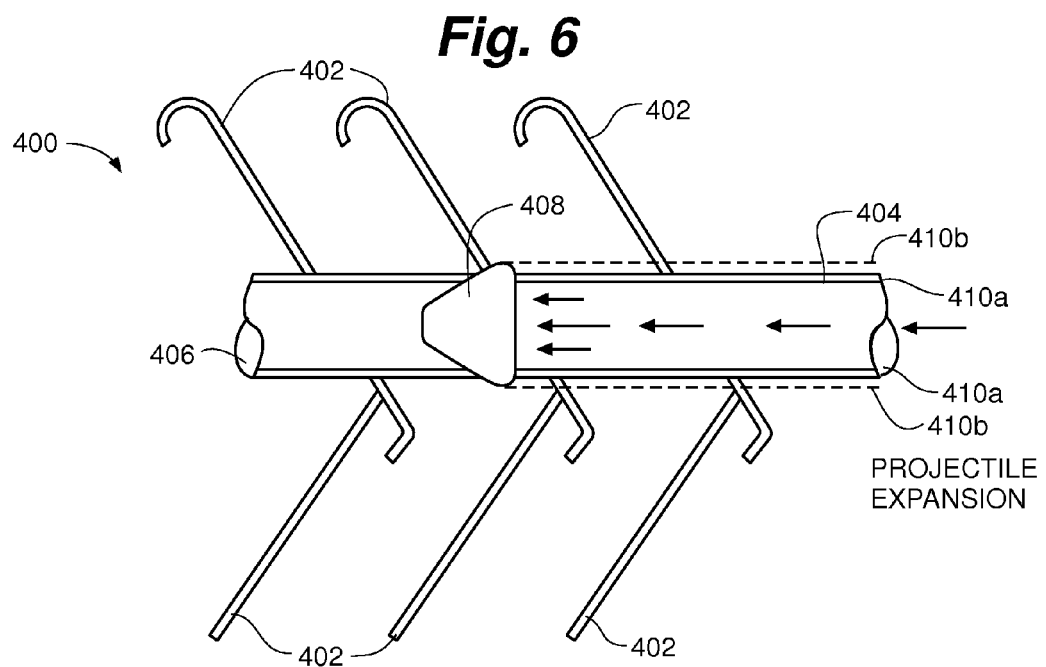

COILS WITH HEADERS ON ONE SIDE - HEAT AND/OR COOL

COILS WITH HEADERS ON MULTIPLE SIDE - HEAT AND/OR COOL

THROUGH FRAME WALLS WITH OR WITHOUT HEADER

MOUNTED IN A PROCESS (RECOVERY, CHEMICAL PROCESSES, SCRUBBERS, GAS COOLERS, ETC.)

AIR INTAKE SEPARATOR SYSTEMS AND METHODS

RELATED APPLICATION

The present application claims the benefit of U.S. Provisional Application No. 61/968,627 filed Mar. 21, 2014, which is incorporated herein in its entirety by reference.

FIELD OF THE INVENTION

The present invention is generally directed to air intake or exhaust separators, and more particularly, to louver or vane separator systems.

BACKGROUND

There is a need to manage the air handling capability for devices exposed to the natural environment. Air intake and air handling systems that draw in outside ambient air also draw in some amount of fluid or precipitation. Some air intake systems add moisture to an air stream for performance advantages such as evaporative cooling and increased density. Other air movement systems need to remove fluids from a process, such as exhaust systems. Vanes or louvers reduce or remove unwanted natural or generated fluids from the air stream. To function properly, vanes or louvers are spaced at distances that achieve desired performance such as fluid removal efficiency, air flow versus restriction, weight, and structural integrity at various velocities. Vanes are typically made from formed or extruded metals such as stainless steel and aluminum or plastics such as PVC and ABS. Other materials or alloys may be also used for different performance scenarios or operating conditions.

Spacing is typically accomplished by adding spacers between each vane or louver. Traditionally, this style of spacer includes one or more apertures to interface with one or more rods. In some cases, the spacer is simply a tube cut to a specific length. A rod or plurality of rods typically insert into the respective apertures that are formed or added through each vane or louver. Adding spacers is very time consuming and is prone to error during assembly. Spacers are often also considered "loose hardware" that is undesirable or unacceptable in many applications. Additionally, fabricating specific lengths of spacers limits performance options. For example, to assemble a traditional vane pack, assemblers must spend hours manually aligning dozens of machined rods and hundreds of spacers. Moreover, if one spacer is missed or coupled backwards or upside down, for example, the entire vane pack must be disassembled in order to fix the incorrect spacer.

Alternatively, spacing may be accomplished by adding comb-style clip spacers to the front and/or rear of the vane or louver profile. Vanes or louvers having comb-style spacers are less time consuming to assemble, but are also typically less reliable. Such spacers are also often considered undesirable or unacceptable "loose hardware" in certain applications. Comb-style spacers can fall off when handling a vane or louver pack. Often, comb-style spacers require additional support structure during installation and during operation.

Another issue effecting air intakes and air handling systems is frost, ice, or snow build up on vanes or louvers. The buildup can dramatically decrease the performance of the vane or louver. At times, the buildup can completely block the flow of air. For example, ice can form on a surface if the surface temperature is lower than the ambient air temperature. The mechanism of ice formation is one of precipitation or condensation, where the dew point of the air is reached and the air is no longer able to support the level of moisture present. The moisture then precipitates from the air onto the surface. If the surface temperature is below freezing the moisture will form into ice. By comparison, snow accumulation presents a completely different challenge. Snow formation temperatures are comparatively high as snow is usually formed between −2 and +5° C. The problem shifts from formation of ice on the vanes to one of clogging. Further, freezing fog can often occur at considerably lower temperatures than snow.

Some vanes and louvers are electrically heated to prevent the inlet icing, snow accumulation, or freezing fog accumulation. This heating is typically accomplished by applying heat tape to channels in the vane or louver. Electrical heating generally requires skilled labor and/or licensed electricians to manufacture and install. However, electrical heating is generally not allowed in some applications such as explosion-proof areas. Additionally, the power consumption can be higher than is desirable.

Accordingly, there is a need for vane or louver systems configured to remove fluid or precipitation from an air stream that is manufactured without spacers, and further configured for safe and cost-effective heating and cooling.

SUMMARY OF THE INVENTION

The present invention is generally directed to air intake or exhaust separator systems. In embodiments, air intake separator or exhaust systems protect turbines, generators, HVAC, ventilation, evaporators, absorbers, gas scrubbers, desulphurization units, gas coolers, natural gas processing plants, exhaust air treatment plants, chemical plants, air handling units, evaporation systems, and other devices, as will be appreciated by one skilled in the art. Specifically, the present invention is directed to air intake or exhaust separator systems and methods of manufacturing comprising inserting tubes through apertures in the vanes and subsequently expanding the tubes. The expanded tubes form to the apertures and lock the vanes in place by an interference or friction fit. Separator systems are thereby configured to remove sea spray, rain, bulk water, salt and other fine deliquesced aerosol debris from air intakes.

In an embodiment, a method of making an air handling or process separator comprises providing a plurality of vanes, each vane having at least one aperture, wherein each vane is positioned substantially parallel to and spaced apart from the other of the plurality of vanes, and wherein the plurality of vanes are configured to reduce fluid from an air stream passing through the air handling separator; inserting at least one coupling tube through the at least one aperture of each of the plurality of vanes, the coupling tube comprising an outer tube wall and a hollow void; expanding the at least one coupling tube; and creating an interference fit between the at least one coupling tube and the plurality of vanes to retain the plurality of vanes.

In an embodiment, an air handling separator comprises a plurality of vanes, each vane having at least one aperture, wherein each vane is positioned substantially parallel to and spaced apart from the other of the plurality of vanes, and wherein the plurality of vanes are configured to reduce fluid from an air stream passing through the air handling separator; and at least one coupling tube comprising an outer tube wall and a hollow void and configured to be inserted through the at least one aperture of each of the plurality of vanes, wherein an interference fit between the at least one coupling tube and the plurality of vanes retains the plurality of vanes.

In an embodiment, a system for air handling comprises an air movement system configured to generate an air stream; and an air handling separator operably coupled to the air movement system such that the air stream passes through the air handling separator, the air handling separator comprising a plurality of vanes, each vane having at least one aperture, wherein each vane is positioned substantially parallel to and spaced apart from the other of the plurality of vanes, and wherein the plurality of vanes are configured to reduce fluid from the air stream; and at least one coupling tube comprising an outer tube wall and a hollow void and configured to be inserted through the at least one aperture of each of the plurality of vanes, wherein an interference fit between the at least one coupling tube and the plurality of vanes retains the plurality of vanes.

In certain embodiments, the present invention is directed to a pack of multiple vanes or louvers separated and fixed in place using tubes. According to embodiments, apertures are formed or added to the vane or louver profile. One or more tubes are inserted through the vanes or louvers. The vanes or louvers are spaced at the desired spacing. In embodiments, the spacing between various vanes can be equal or variable depending on, for example, the performance required. Fluid is added to the one or more tubes and pressurized until the one or more tubes expands. The expanded tubes capture the vanes or louvers and hold the vanes or louvers in place.

In certain embodiments, tubes can be constricted in a vacuum-style method of manufacture. When vanes or louvers are in desired positions, a vacuum is released, thereby allowing the tube to expand. The expanded tubes capture the vanes or louvers and hold the vanes or louvers in place. In embodiments, vane or louver securement can also be accomplished by forcing a solid object that is larger than the inner diameter of the tube through the tube, thereby mechanically pushing or expanding the tube diameter. In embodiments, additional material or fluid such as expanding foam can be added to retain the expansion.

In certain embodiments, differential thermal expansion can be utilized for vane or louver securement. This is accomplished by heating the vanes and chilling the tubes or rods using, for example, liquid nitrogen. When the vanes and tubes combinations are subsequently assembled and temperatures normalize, an interference fit is created.

In certain embodiments, a flexible material tube can be inserted through vane or louver apertures, whereby a solid or semi-solid rod is subsequently inserted into the tube. This causes the tube to expand and grip the vane or louver apertures, thereby creating an interference fit.

In certain embodiments, a fluid can be circulated through the vanes or louvers or the coupling tubes in an open or closed loop system to heat or cool the air stream and achieve a desired performance. In an embodiment, heating with a fluid through the tubes prevents inlet icing and allows the vane or louver to effectively capture and drain fluid from the air stream when temperatures are below the freezing point. Cooling with a fluid through the tubes increases the air density, thereby improving the system performance. According to embodiments, heat transfer fluid(s) with or without additives can be added and circulated; for example glycol, methanol, glycerol, water, OAT (organic acid technology), or HOAT (hybrid organic acid technology), or oil base. Other heat transfer fluids such as gases can be utilized, according to embodiments.

In certain embodiments, heating can be accomplished by heating a fluid and circulating the fluid through tubes installed in semi-open or enclosed channels in vanes and louvers. According to embodiments, channels generally run the length of the vane or louver. In other embodiments, tubes can be clipped to the vane. In other embodiments, fluid can be circulated through channels or hollow sections in the vane or louver. In embodiments of systems of air intake separators protecting an engine, the engine exhaust can be diverted to heat the respective channels of the tubes or sections of the vanes or louvers.

In certain embodiments, coupling tubes can be made of a metallic material such as copper, aluminum, stainless steel, brass, alloy, Hastelloy, AL6NX, or any other suitable metallic material. In embodiments, tubes can be made of a plastic material such as PEX, PVC, CPVC, ABS, PTFE, polypropylene, polyethylene, composite polymer or any other suitable plasticized material. In embodiments, vanes or louvers can be made of aluminum, copper, stainless steel, brass, alloy, plastic, composite polymer, recycled material, partly recycled material, durable material, semi-durable material, or any other suitable material.

In certain embodiments, tubes can have a regular or irregular cross-sectional shape. For example, cross-sectional shapes can comprise round, triangular, rectangular, or oval. In embodiments, other cross-sectional shapes can be utilized, according to, for example, the particular application of the separator systems or desired manufacturing method.

In an embodiment, a method of making a vane separator system comprises punching a plurality of vanes with one or more apertures. For example, the apertures can be ⅜" voids. In other embodiments, the apertures can comprise diameters greater than or less than ⅜". The method can further comprise loading the vanes into a fixture. The method can further comprise laser cutting a reusable comb to space the vanes. The method can further comprise inserting one or more coupling tubes through the vane apertures. The method can further comprise hydraulically expanding the coupling tubes to create an interference fit between the coupling tubes at the point of contact with the respective vane. According to the method of making an air intake or exhaust separator system, the vane pack is solid and ready for a frame and subsequent mounting to the air movement system that it is to protect. In an embodiment, after expansion, the ends of the tubes can be cut off and left open. In such embodiments, the tubes act as a fastener.

According to a feature and advantage of embodiments, no spacers or loose hardware are required in a vane or louver system. This obviates the need to select a proper spacer material to prevent breaking or cracking of the spacers during use. As a result, there is no danger of sending pieces of the vane or louver system downstream to the turbine. Further, neither the manufacturer nor the end user needs to worry about overheating or melting spacers.

According to a feature and advantage of embodiments, spacing between vanes or louvers can be set to match performance needs. In embodiments, variable spacing between vanes of the same system or, more simply, fixed uniform spacing between vanes of the same system according to the specific application can easily be constructed. In embodiments, a virtually unlimited number of spacing configurations can be created. Tighter vane spacing provides higher efficiency but lower air flow, whereas looser vane spacing provides lower efficiency but a higher air flow. According to embodiments, vane spacing can be set to provide a balance between air flow and efficiency. In embodiments, spacing between vanes or louvers can be between 5 mm and 150 mm. In other embodiments, spacing between vanes or louvers can be less than 5 mm or greater than 150 mm.

According to a feature and advantage of embodiments, manufacturing time is greatly reduced. No molds or models of spacers need to be created for embodiments of the invention. More importantly, the assembly time is greatly reduced compared to traditional vane or louver system assembly.

According to a feature and advantage of embodiments, product strength and reliability is improved over traditional vane or louver systems. The interference fit created between vanes and rods according to systems of embodiments are substantially stronger than the aggregation of multiple spacers, rods, and vanes of traditional systems.

According to a feature and advantage of embodiments, a heat transfer fluid can be easily added to heat the vanes or louvers and prevent inlet icing. In embodiments, a heat transfer fluid can be added to heat the tubes coupling the vanes or louvers. According to embodiments, heating configurations eliminate the need for expensive and often dangerous application of heat tape. In embodiments, a heat transfer fluid can likewise be easily removed from the vanes or louvers. Likewise, according to a feature and advantage of embodiments, systems can add heat transfer fluid to heat or cool the air stream for desired air temperature.

According to a feature and advantage of embodiments, systems combine water removal with condensing coil technology for substantial performance gains and reduced system costs compared to traditional systems. For example, traditional chiller coils require separate vanes to eliminate condensation. In embodiments of the invention, a single set of vanes is configured for both condensing and water removal.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE DRAWINGS

The invention can be completely understood in consideration of the following detailed description of various embodiments of the invention in connection with the accompanying drawings, in which:

FIG. 5 is a cross-sectional view of an air intake or exhaust separator system, including annotated markings illustrating a portion of a method of attaching the vanes with a fluid or pneumatic expansion technique, according to an embodiment of the invention.

FIG. 6 is a cross-sectional view of an air intake or exhaust separator system, including annotated markings illustrating a portion of a method of attaching the vanes with a projectile expansion technique, according to an embodiment of the invention.

Figure 1:
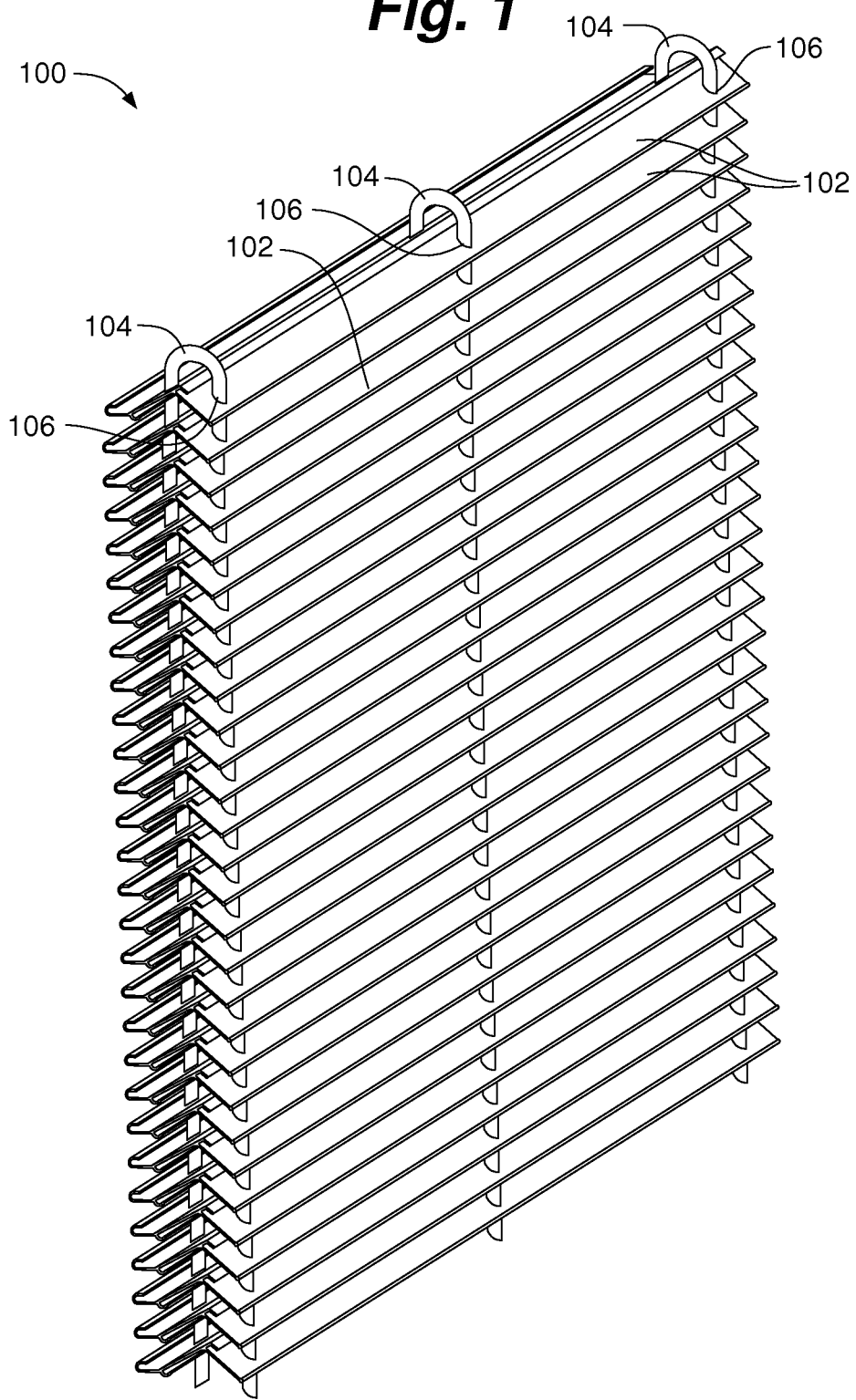
FIG. 1 is a perspective view of an air intake or exhaust separator system, according to an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

According to embodiments of the invention, an air intake or exhaust separator system comprises a plurality of vanes or louvers adapted to remove fluid or precipitation from an air stream, wherein the vanes or louvers are operably coupled to tubular rods with an interference fit.

According to embodiments of the invention, an air intake or exhaust separator system can be created by expanding a tube or rod to retain multiple vanes or louvers, wherein the air intake or exhaust separator system is adapted to remove fluid or precipitation from the air stream.

According to embodiments of the invention, an air intake or exhaust separator system comprises a plurality of vanes or louvers adapted to remove fluid or precipitation from an air stream, wherein the air intake separator system or vane pack is manufactured without individual or multiple spacers separating the plurality of vanes or louvers.

According to embodiments of the invention, applying a heat transfer fluid to a plurality of vanes or louvers removes fluid or precipitation from an air stream in order to prevent ice formation. Likewise, applying a cool transfer fluid can cool the vanes or louvers.

According to embodiments of the invention, applying a heat transfer fluid to a plurality of vanes or louvers removes fluid or precipitation from an air stream in order to heat or cool the air stream.

Figure 2:
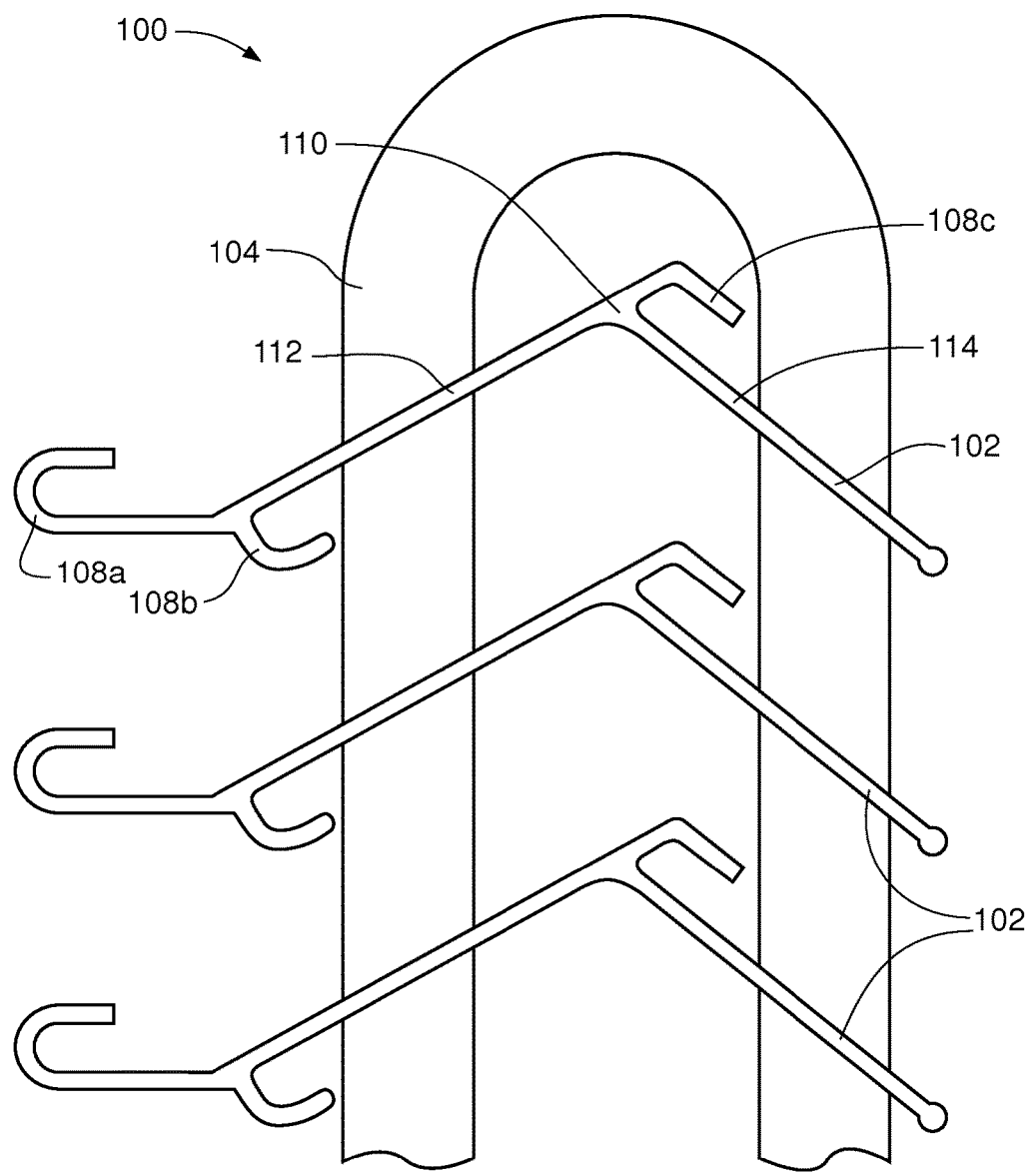
FIG. 2 is a side view of the air intake or exhaust separator system of FIG. 1, according to an embodiment of the invention.
Figure 3:
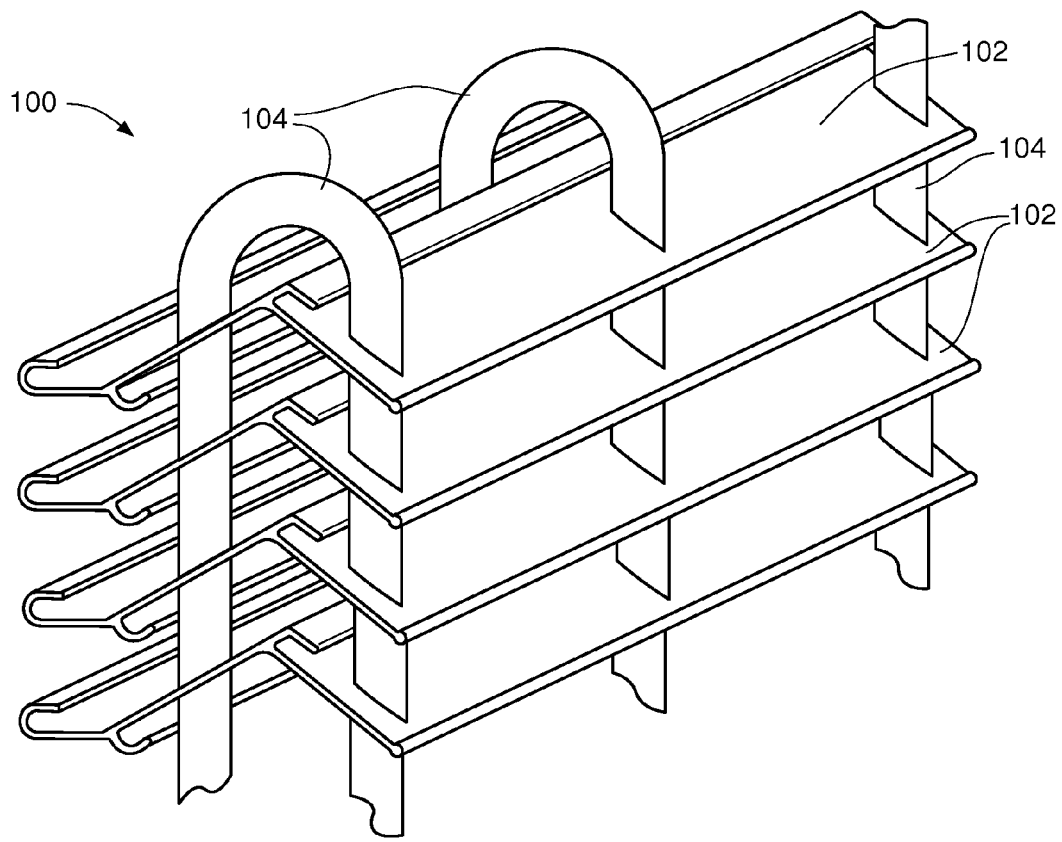
FIG. 3 is a close perspective view of the air intake or exhaust separator system of FIG. 1, according to an embodiment of the invention.

Referring to FIGS. 1-3, an air intake or exhaust separator system 100 is depicted, according to an embodiment. In general, air intake or exhaust separator system 100 comprises a plurality of vanes 102 (or louvers) spaced apart and at least one tube 104 operably coupling the vanes. As is readily understood by one skilled in the art, the use of "vanes" includes "louvers" and other similar structures. For simplicity in describing the embodiments depicted in the figures herein, the terminology "vanes" is used from this point forward. This structure in no way limits the type of vane, louver, or other similar structure that can be used, as these embodiments and terminology are given only by way of example and for ease of discussion, and are not intended to limit the scope of the subject matter of the invention. The plurality of vanes 102 are operably coupled to the at least one tube 104 by an interference or friction fit 106, thereby creating the aforementioned spacing without mechanical spacers.

As shown in FIG. 1, system 100 generally comprises a plurality of vanes 102. The remaining vanes are not labeled to preserve the readability of the figure. The vanes 102 are spaced apart and substantially parallel to each other. In embodiments, vanes 102 can be positioned nominally parallel to each other. In other embodiments, vanes 102 can be positioned such that they are not parallel to each other. For example, by further angling one or more vanes 102 relative to the other vanes 102 such that vanes 102 are not parallel to each other, air flow through system 100 can be changed. Likewise, by further angling one or more vanes 102 relative to the other vanes 102 such that vanes 102 are not parallel to each other, the fluid removal properties of system 100 can be changed.

In an embodiment, vanes 102 can be spaced apart equally throughout system 100. In another embodiment, vanes 102 can be spaced apart such that the spacing varies throughout system 100. System 100 can comprise any number of vanes 102. Each of vanes 102 comprise at least one aperture configured to receive a tube 104. As shown more particularly in FIGS. 2-3, vanes 102 can comprise ridged portions and smooth portions. In an embodiment, each of vanes 102 comprises ridges on both relative sides of vane 102.

Referring specifically to FIG. 2, each of vanes 102 is generally angled, comprising a vertex 110 and a first extending portion 112 and a second extending portion 114. Each of first extending portion 112 and second extending portion 114 extend from vertex 110. Each of vanes 102 can further comprise one or more projections. For example, vane 102 comprises projection 108a, projection 108b, and projection 108c. In embodiments, projections 108a-108c are configured to aid in air flow. In embodiments, projections 108a-108c are configured to aid in removing fluid from an air stream flowing therethrough. For example, projection 108a can be elongated and rounded. Projection 108b can be short and rounded. Projection 108c can be squared-off. In embodiments, referring specifically to FIG. 3, portions of projections 108 can comprise smooth surfaces. Likewise, though not labeled on the figures, vanes 102 can comprise similar projections.

In embodiments, vanes 102 can be made of can be made of aluminum, copper, stainless steel, brass, alloy, plastic, composite polymer, recycled material, partly recycled material, durable material, semi-durable material, or any other suitable material.

System 100 further comprises a plurality of tubes 104. As shown in FIG. 1, tubes 104 are spaced equally apart. In other embodiments, tubes 104 can be spaced apart such that the distance varies between any two tubes. In embodiments, system 100 can comprise any appropriate number of tubes 104. In embodiments, as will be described, tubes 104 are configured for coupling the plurality of vanes 102.

Tubes 104 are generally hollow, in an embodiment. As shown in FIGS. 1-3, tubes 104 can be continuous such that a continuous hollow portion of a single tube is looped or curved and presented through different apertures of the same vane 102. In other embodiments, tubes 104 can be discrete and separated such that a first tube is presented through an aperture of a first vane, and a second tube is presented through a different aperture of the first vane. Tubes 104 are therefore configured to support vanes 102 within system 100.

In embodiments, tubes 104 can be made of a metallic material such as copper, aluminum, stainless steel, brass, alloy, Hastelloy, AL6NX, or any other suitable metallic material. In embodiments, tubes can be made of a plastic material such as PEX, PVC, CPVC, ABS, PTFE, polypropylene, polyethylene, composite polymer or any other suitable plasticized material.

Referring again to FIG. 1, at 106, an interference fit is created between vane 102 and tube 104. Particularly, the fit is created within an aperture of vane 102. Similar fits are created between the other of the plurality of vanes 102, within the respective apertures of vanes 102.

Figure 4:
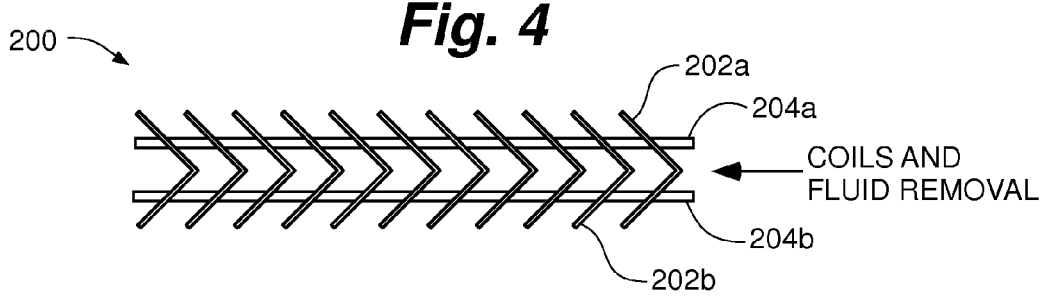
FIG. 4 is a schematic diagram of an air intake or exhaust separator system without a fluid return, according to an embodiment of the invention.

Referring to FIG. 4, a schematic diagram of an air intake or exhaust separator system 200 illustrates the plurality of vanes 202 coupled respectively to a first tube 204a and a second tube 204b, according to an embodiment. In other embodiments, additional or fewer tubes can be utilized. As illustrated by the contrast to FIGS. 1-3, the coupling tubes can be continuous or discrete and separated such that first tube 204a is presented through a first aperture of a first vane 202a, and second tube 204b is presented through a second aperture of the first vane 202a, as shown in FIG. 4. Likewise, first tube 204a can be presented through a first aperture of a second vane 202b, and second tube 204b can be presented through a second aperture of the second vane 202b. Once presented in the manner described herein, tubes 204a-204b can be operably coupled to vanes 202a-202b, and the other of the plurality of vanes. As will be readily understood by one skilled in the art, similar presentations and couplings can be made with the rest of the plurality of vanes and first tube 204a and second tube 204b. In an embodiment, vanes can be operably coupled by a fluid or pneumatic expansion technique. Referring to FIG. 5, a cross-sectional view of an air intake or exhaust separator system 300 is illustrated that depicts a method of attaching the vanes with a fluid or pneumatic expansion technique, according to embodiments of the invention. For example, system 300 can comprise a plurality of vanes 302 and one or more tubes 304. In an embodiment, tube 304 can be a cylinder and comprise a circumferential wall 306.

In embodiments, a fluid (denoted by arrows 308) is pumped into tube 304 such that fluid 308 forces wall 306 of tube 304 apart after vanes 302 have been positioned, thereby creating a fit between vane 302 and tube 304. In other embodiments, a pneumatic expansion forces wall 306 of tube 304 apart after vanes 302 have been positioned. Consequently, wall 306 moves from position 310a to position 310b.

In an embodiment, vanes can be operably coupled by a projectile expansion technique. Referring to FIG. 6, a cross-sectional view of an air intake or exhaust separator system 400 is illustrated that depicts a method of attaching the vanes with a projectile expansion technique, according to an embodiment of the invention. For example, system 400 can comprise a plurality of vanes 402 and one or more tubes 404. In an embodiment, tube 404 can be a cylinder and comprise a circumferential wall 406.

Figure 8A:
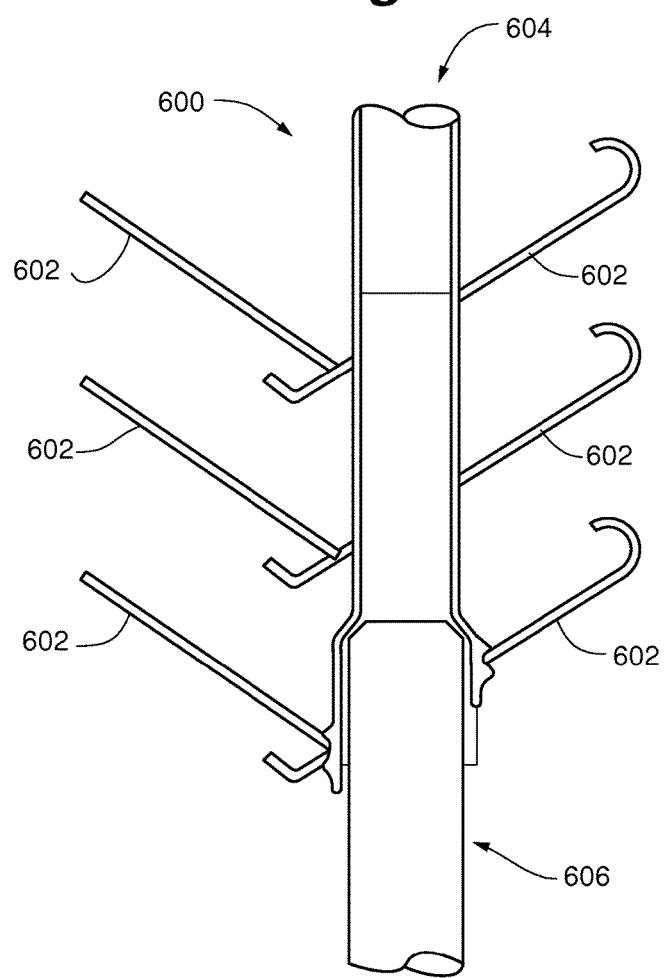
FIG. 8A is a side view of an air intake or exhaust separator system formed by a projectile expansion technique of a flexible tube, according to an embodiment of the invention.

In embodiments, a projectile 408 is positioned or forced into tube 404 such that projectile 408 forces wall 406 of tube 404 apart after vanes 402 have been positioned, thereby creating a fit between vane 402 and tube 404. The insertion or positioning of projectile 408 is denoted by the arrows through tube 404 in FIG. 6. Consequently, wall 406 moves from position 410a to position 410b. A projectile expansion is also depicted in FIG. 8A.

Figure 7:
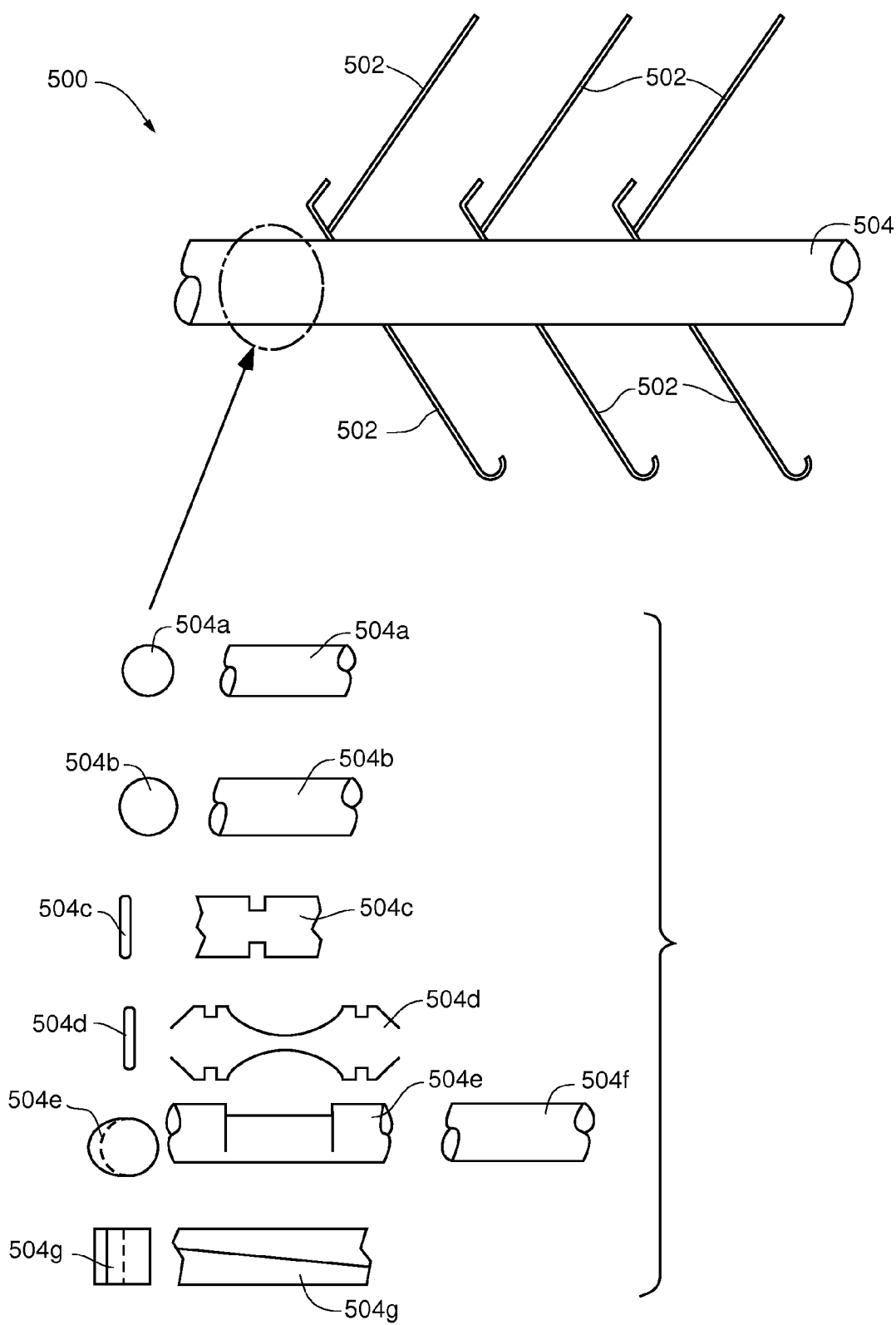
FIG. 7 is a side view of an air intake or exhaust separator system, according to an embodiment of the invention, including various embodiments of a tie rod section.

Referring to FIG. 7, a side view of an air intake or exhaust separator system 500 is depicted, along with exemplary embodiments of various tie rod sections. System 500 generally comprises a plurality of vanes 502 and a tie rod 504 operably coupling the plurality of vanes 502. As depicted, the tie rod can by round, square, hexagonal, rectangular, or any other suitable shape. In embodiments, a solid rod or tube can be expanded to grip the vanes or otherwise provide an interference fit. In embodiments, a solid rod or tube can be coated with glue, a hot melt material, or "welded" to secure the vanes by chemical, thermal, or mechanical fit. In embodiments, a flat bar or other tie rod section can comprise notches cut for the vanes. In such embodiments, the flat bar is rotated to lock the vanes in place. In embodiments, a tie rod section can comprise additional sections to be rotated, twisted, slid, or otherwise mechanically coupled to lock the vanes in place. In embodiments, a tie rod can be a continuous or discontinuous cam section such that rotation or sliding of the tie rod grips the vanes. In embodiments, a tie rod can be square, round, or comprise a supplemental section in "wedges" so that relative sliding causes the wedges to grip the vanes.

For example, a cross-sectional view and a side view of a tie rod 504a is shown in FIG. 7. As illustrated, tie rod 504 comprises a round cross-section. Tie rod 504a can be a solid rod or a hollow tube that can be expanded to grip the vanes or otherwise provide an interference fit.

In another example, a cross-sectional view and a side view of a tie rod 504b is shown in FIG. 7. As illustrated, tie rod 504b comprises a round cross-section. Tie rod 504b can be a solid rod or a hollow tube that can be coated with glue, a hot melt material, or "welded" to secure the vanes by chemical, thermal, or mechanical fit.

In another example, a cross-sectional view and a side view of a tie rod 504c is shown in FIG. 7. As illustrated, tie rod 504c comprises a thin or flat bar cross-section. Tie rod 504c can comprise notches cut for vanes 502. In such embodiments, tie rod 504c is rotated to lock vanes 502 in place.

In another example, a cross-sectional view and a side view of a tie rod 504d is shown in FIG. 7. As illustrated, tie rod 504d comprises a more complex shape having a thin or flat bar cross-section. Tie rod 504d can comprise notches cut for vanes 502. In such embodiments, tie rod 504d is rotated to lock vanes 502 in place.

In another example, a cross-sectional view and a side view of a tie rod 504e is shown in FIG. 7. As illustrated, tie rod 504e comprises an elongated circle cross-section. Tie rod 504e can comprise a discontinuous cam section. In such embodiments, rotation or sliding of tie rod 504e grips and retains vanes 502. In a similar embodiment, tie rod 504f can comprise a continuous cam section.

In another example, a cross-sectional view and a side view of a tie rod 504g is shown in FIG. 7. As illustrated, tie rod 504g comprises a square or "wedged" cross-section. Tie rod 504g comprises "wedges" so that relative sliding causes the wedges to grip vanes 502. In other embodiments, tie rod 504g can comprise a round or otherwise "wedged" cross-section.

Figure 8B:
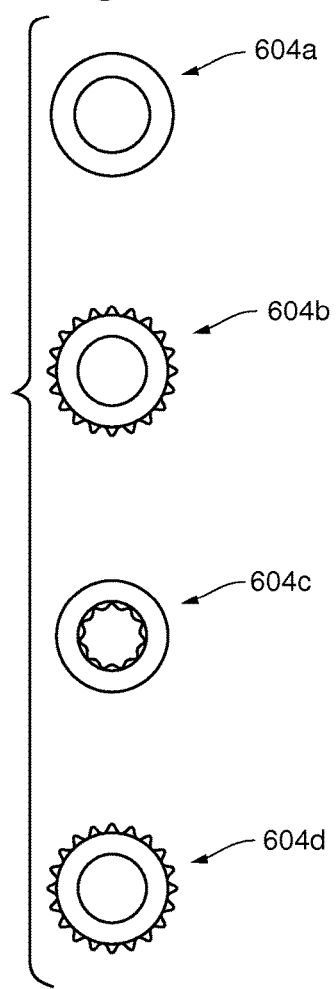
FIG. 8B is a cross-sectional view of a plurality of exemplary flexible tubes of FIG. 8A, according to embodiments of the invention.
Figure 9:
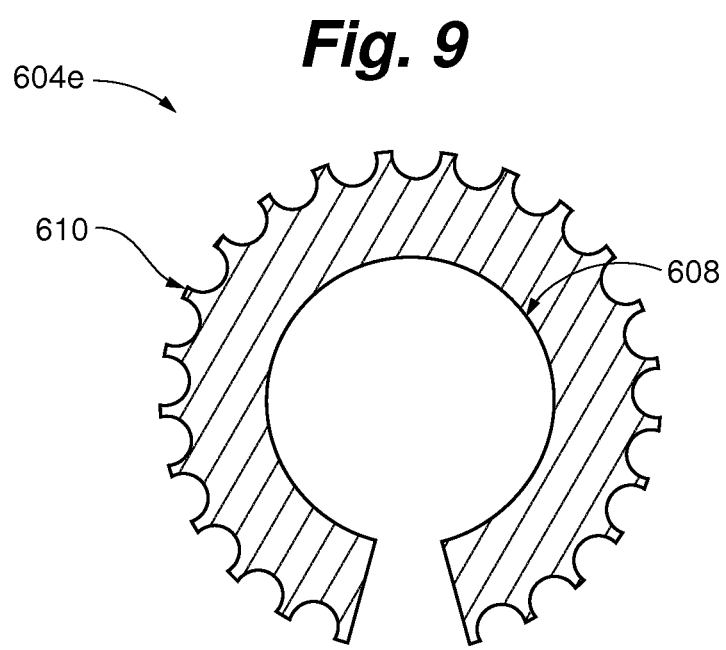
FIG. 9 is a schematic diagram of an exemplary flexible tube of an air intake or exhaust separator system, according to an embodiment of the invention.

Referring to FIG. 8A, a side view of an air intake or exhaust separator system 600 formed by a projectile expansion technique of a flexible tube is depicted, according to an embodiment. As depicted, a plurality of vanes 602 are positioned at a desired spacing along a flexible tube 604. A rigid tube or rod 606 is subsequently forced through flexible tube 604, thereby creating an interference fit at the point where vanes 602 interface to flexible tube 604. Flexible tube 604 can comprise a number of profiles, as illustrated by FIG. 8B. For example, flexible tube 604a comprises a tube without any inner or outer ridges. Flexible tube 604b comprises a tube without any inner ridges, and with outer ridges. Flexible tube 604c comprises a tube with inner ridges and without any outer ridges. Flexible tube 604d comprises a tube with inner ridges and outer ridges. In another example, referring to FIG. 9, a cross-sectional view of a flexible tube 604e comprises an inner diameter 608 and an outer diameter 610. As depicted, inner diameter 608 is generally smooth and outer diameter 610 is generally ridged. One skilled in the art will readily appreciate that other profiles can also be used.

In assembly, referring again to FIG. 8A, flexible tube 604 having inner or outer ridges of embodiments described herein can be inserted into the apertures of vane 602. Subsequently, a rigid tube or rod 606 can be inserted into the hollow tube, thereby causing expansion of flexible tube 604. As a result, the expansion grips the apertures of vane 602 and locks vanes 602 in place.

Figure 10A:
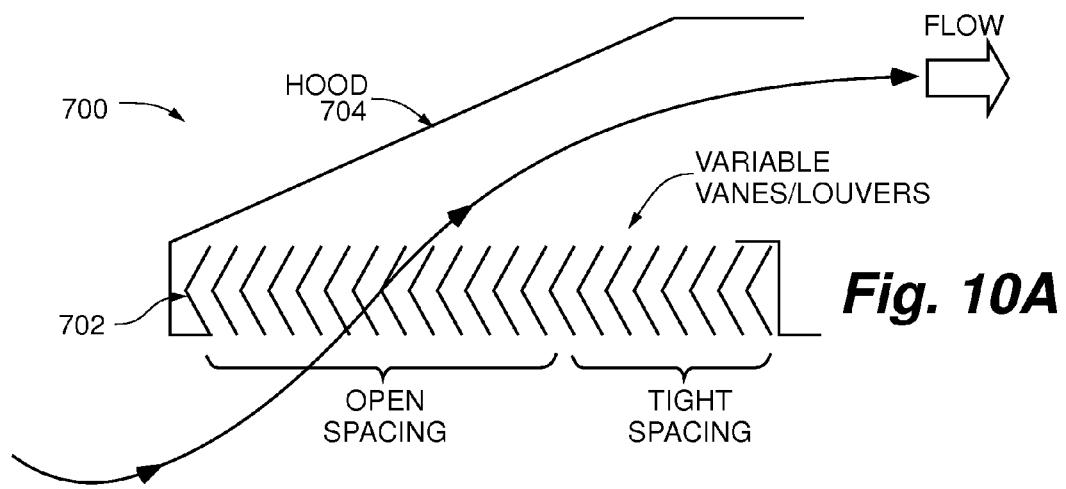
FIG. 10A is a schematic diagram of an air intake or exhaust separator system including variable pitch vanes or louvers according to an embodiment of the invention.
Figure 10B:
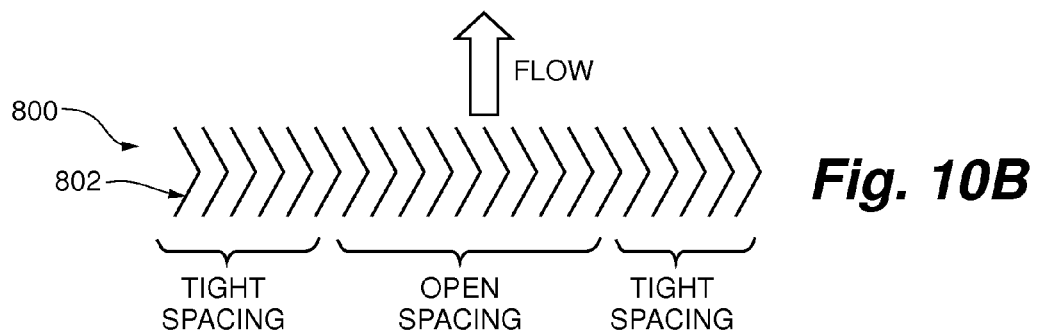
FIG. 10B is a schematic diagram of an air intake or exhaust separator system including variable pitch vanes or louvers according to an embodiment of the invention.
Figure 10C:
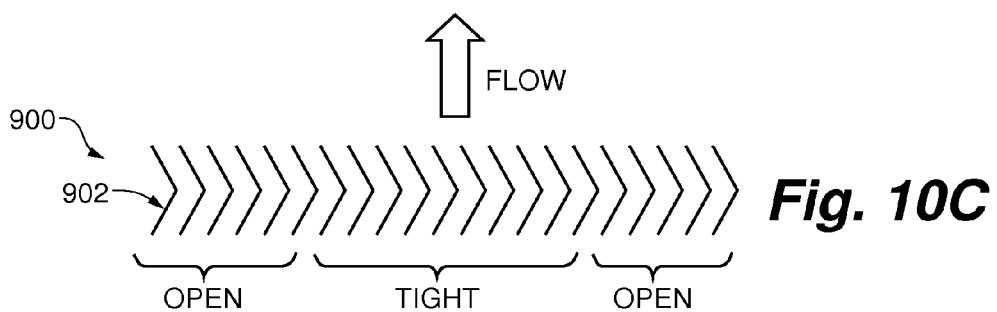
FIG. 10C is a schematic diagram of an air intake or exhaust separator system including variable pitch vanes or louvers according to an embodiment of the invention.

Referring to FIGS. 10A-10C, myriad positions for vanes are considered, according to the variation desired by the application of the air intake or exhaust separator system. In embodiments, all of the vanes or louvers can be positioned uniformly along the coupling tube. In other embodiments, the vanes have variable spacing, such as open, tight, or intermediate spacing.

For example, referring to FIG. 10A, system 700 comprises a plurality of vanes 702 and a hood 704. In embodiments as described above, the plurality of vanes 702 can be operably coupled by one or more coupling tubes (not shown). In an embodiment, vanes 702 having an open spacing proximate hood 704 and a tight spacing distal hood 704 creates an angular flow of air generally parallel to hood 704. Therefore, vanes 702 are variably spaced throughout system 700.

In another example, referring to FIG. 10B, system 800 comprises a plurality of vanes 802. In embodiments as described above, the plurality of vanes 802 can be operably coupled by one or more coupling tubes (not shown). In an embodiment, vanes 802 comprise a sequential spacing of a first tight spacing, an open spacing, and a second tight spacing. Therefore, vanes 802 are variably spaced throughout system 800. The flow of air through the first tight spacing, differs from the flow of air through the open spacing. In an embodiment, the first tight spacing and the second tight spacing are the same. In such embodiments, the flow of air through the first tight spacing and the second tight spacing are the same. However, in other embodiments, the first tight spacing and the second tight spacing are different. In such embodiments, the flow of air through the first tight spacing differs from the flow of air from the second tight spacing.

In another example, referring to FIG. 10C, system 900 comprises a plurality of vanes 902. In embodiments as described above, the plurality of vanes 902 can be operably coupled by one or more coupling tubes (not shown). In an embodiment, vanes 902 comprise a sequential spacing a first open spacing, a tight spacing, and a second open spacing. Therefore, vanes 902 are variably spaced throughout system 900. The flow of air through the first open spacing differs from the flow of air through the tight spacing. In an embodiment, the first open spacing and the second open spacing are the same. In such embodiments, the flow of air through the first open spacing and the second open spacing are the same. However, in other embodiments, the first open spacing and the second open spacing are different. In such embodiments, the flow of air through the first open spacing differs from the flow of air from the second open spacing.

Figure 11A:
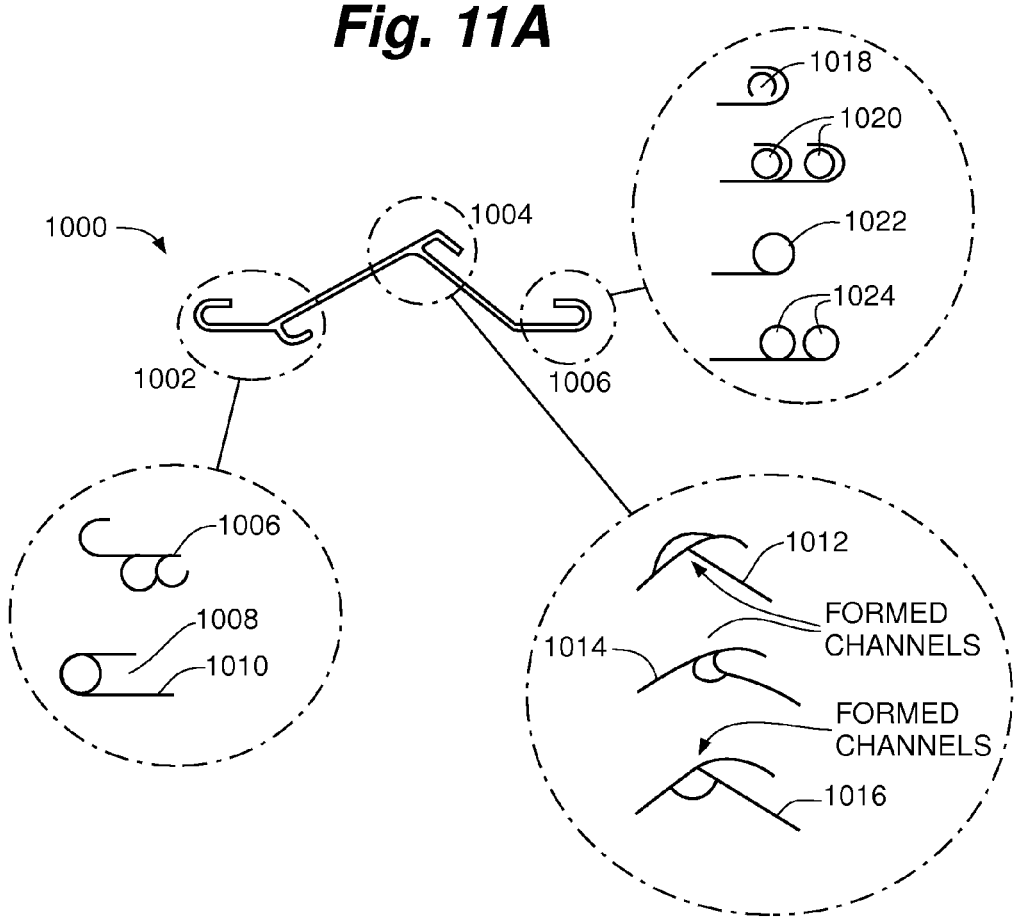
FIG. 11A is a schematic diagram of an individual vane including a plurality of exemplary channel embodiments for components of the vane.

Referring to FIG. 11A, a schematic diagram of an individual vane 1000 is depicted. In an embodiment, vane 1000 generally comprises a leftmost arm 1002, a center arm 1004, and a rightmost arm 1006.

Referring first to leftmost arm 1002 of vane 1000, in an embodiment, leftmost arm 1002 can comprise a formed channel 1006, in an embodiment. In another embodiment, leftmost arm 1002 can comprise a deep catch with a coupled tube 1008. In another embodiment, leftmost arm can comprise a deep catch with a formed channel 1010.

Center arm 1004 can comprise myriad formed channel configurations, as depicted, in embodiments. In embodiments, the center arm can comprise a plurality of formed channels, such as formed channel 1012, formed channel 1014, and formed channel 1016.

Rightmost arm 1006 can comprise a catch with a tube added 1018. In another embodiment, rightmost arm 1006 can comprise multiple catches with multiple tubes 1020. In another embodiment, rightmost arm can comprise a formed channel 1022. In another embodiment, rightmost arm can comprise a plurality of formed channels 1024, in embodiments.

Figure 11B:
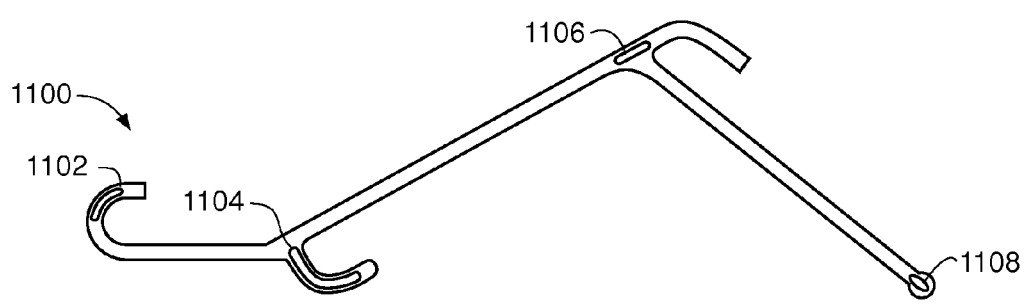
FIG. 11B is a schematic diagram of an at least partially hollow vane, according to an embodiment of the invention.

Referring to FIG. 11B, according to embodiments, a vane 1100 can comprise a hollow, semi-hollow, partially hollow, or substantially hollow body, as illustrated. For example, vane 1100 comprises a first hollow body 1102, a second hollow body 1104, a third hollow body 1106, and a fourth hollow body 1108. In embodiments, any of bodies 1102-1108 can be semi-hollow, partially hollow, or substantially hollow. The structure of bodies 1102-1108 are configured for removal of fluid from the air stream through vane 1100.

Figure 12A:
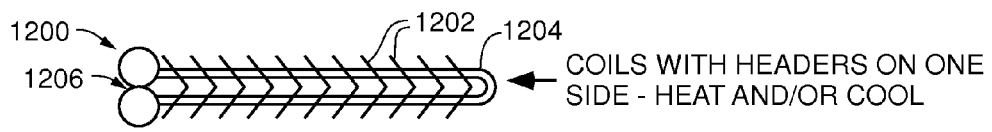
FIG. 12A is a schematic diagram of an air intake or exhaust separator system, according to an embodiment of the invention.

Referring to FIG. 12A, a schematic diagram of an air intake or exhaust separator system 1200 is depicted. System 1200 generally comprises a plurality of vanes 1202, at least one coupling tube 1204, and one or more headers 1206. In an embodiment as depicted, air intake separator system 1200 can comprise one or more headers 1206 on a single side of system 1200. Headers 1206 can be utilized for heating or cooling via the coupling tubes 1204. In other embodiments, one or more manifolds can be positioned similar to one or more headers 1206, and utilized similarly for heating or cooling via coupling tubes 1204.

Figure 12B:
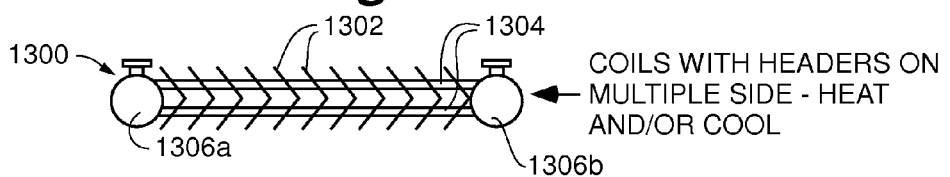
FIG. 12B is a schematic diagram of an air intake or exhaust separator system, according to an embodiment of the invention.

Referring to FIG. 12B, an air intake separator system 1300 can comprise one or more headers on multiple sides of system 1300. System 1300 generally comprises a plurality of vanes 1302, at least one coupling tube 1304, and one or more headers 1306. In an embodiment, as depicted, air intake separator system 1300 comprises a first header 1306a on one side of system 1300, and a second header 1306b on an opposite side of system 1300. Headers 1306a and 1306b can be utilized for heating or cooling via coupling tubes 1304. In other embodiments, one or more manifolds can be positioned similar to one or more headers 1306a and 1306b, and utilized similarly for heating or cooling via the coupling tubes 1304.

Figure 12C:
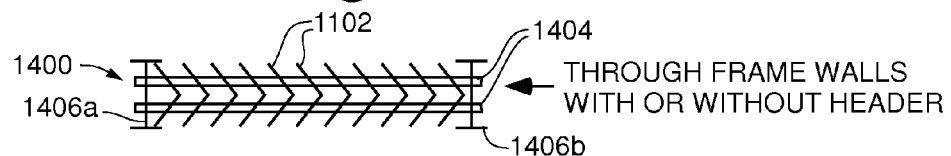
FIG. 12C is a schematic diagram of an air intake or exhaust separator system, according to an embodiment of the invention.

Referring to FIG. 12C, an air intake separator system 1400 can comprise a mounting with frame walls with or without a header. For example, system 1400 generally comprises a plurality of vanes 1402, at least one coupling tube 1404, and frame walls 1406. In an embodiment as depicted, air intake separator system 1400 generally comprises a plurality of vanes 1402, at least one coupling tube 1404, and one or more frame supports 1406. In an embodiment, as depicted system 1400 is mounted through frame support 1406a and frame support 1406b without any headers. In other embodiments, system 1400 can further comprise a header, wherein frame support 1406a and frame support 1406b can further support mounting such a system.

Figure 13:
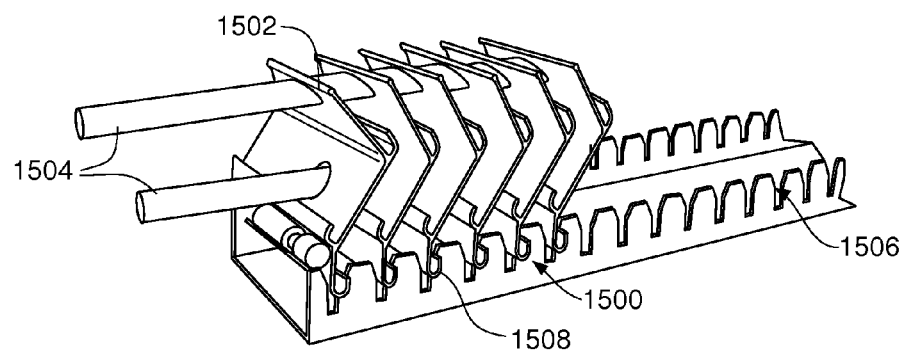
FIG. 13 is a perspective view of a section of an air separator system in a holding rack, according to an embodiment.

Referring to FIG. 13, a perspective view of a section of a separator system 1500 is depicted, according to an embodiment. As depicted, system 1200 generally comprises a plurality of vanes 1502 and two coupling tubes 1504. The two coupling tubes 1504 are positioned proximate each other and generally parallel across a single vane 1502. System 1500 is pictured in a holding rack 1508. Holding rack 1506 comprises a series of apertures 1508 configured to receive the plurality of vanes 1502 of system 1500. In an embodiment, holding rack 1506 can be utilized during the assembly of system 1500.

Figure 14:
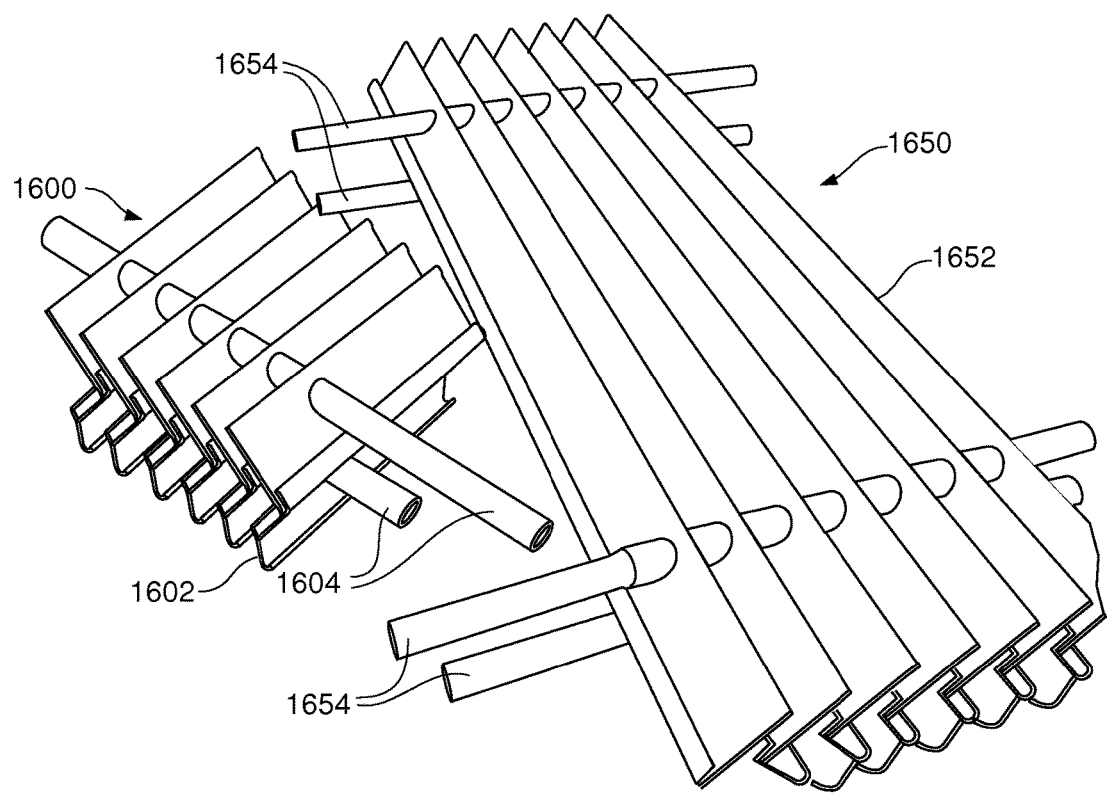
FIG. 14 is a perspective view of two air separator systems, according to embodiments.

Referring to FIG. 14, perspective view of two separator systems is depicted, according to an embodiment. In an embodiment, as depicted, system 1600 generally comprises a plurality of vanes 1602 and two coupling tubes 1604. The two coupling tubes 1604 are positioned proximate each other and generally parallel across a single vane 1602. As depicted, coupling tubes 1604 are offset from the center of the length of vanes 1602. System 1650 generally comprises a plurality of vanes 1652 and a plurality of discrete coupling tubes 1654.

Figure 15:
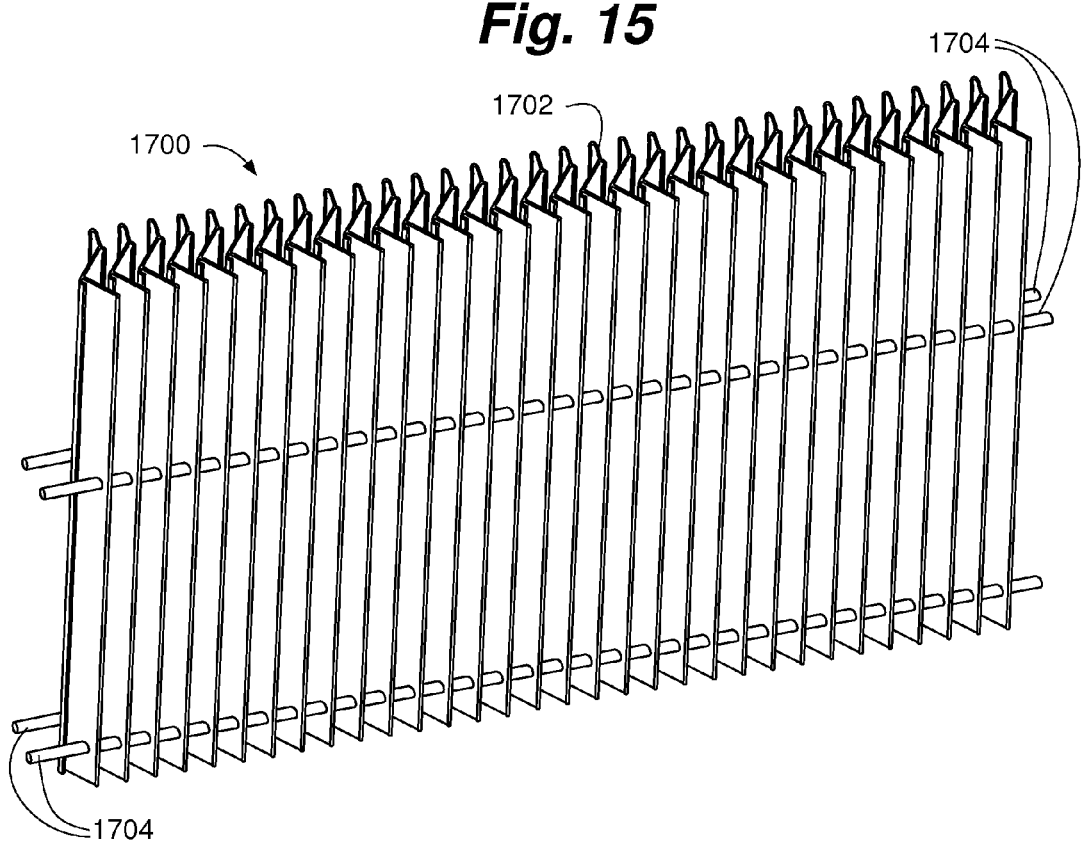
FIG. 15 is a perspective view of an air separator system, according to an embodiment.

Referring to FIG. 15, a perspective view of a separator system 1700 is depicted, according to an embodiment. System 1500 generally comprises a plurality of vanes 1702 and a plurality of discrete coupling tubes 1704. As depicted, coupling tubes 1704 are positioned off-center from the length of the plurality of vanes 1702. For example, a first set of coupling tubes 1704 is positioned nearly to one side of system 1700. Another set of coupling tubes 1704 is positioned more proximate the center, but still offset from the center of the length of the plurality of vanes 1702.

Figure 16:
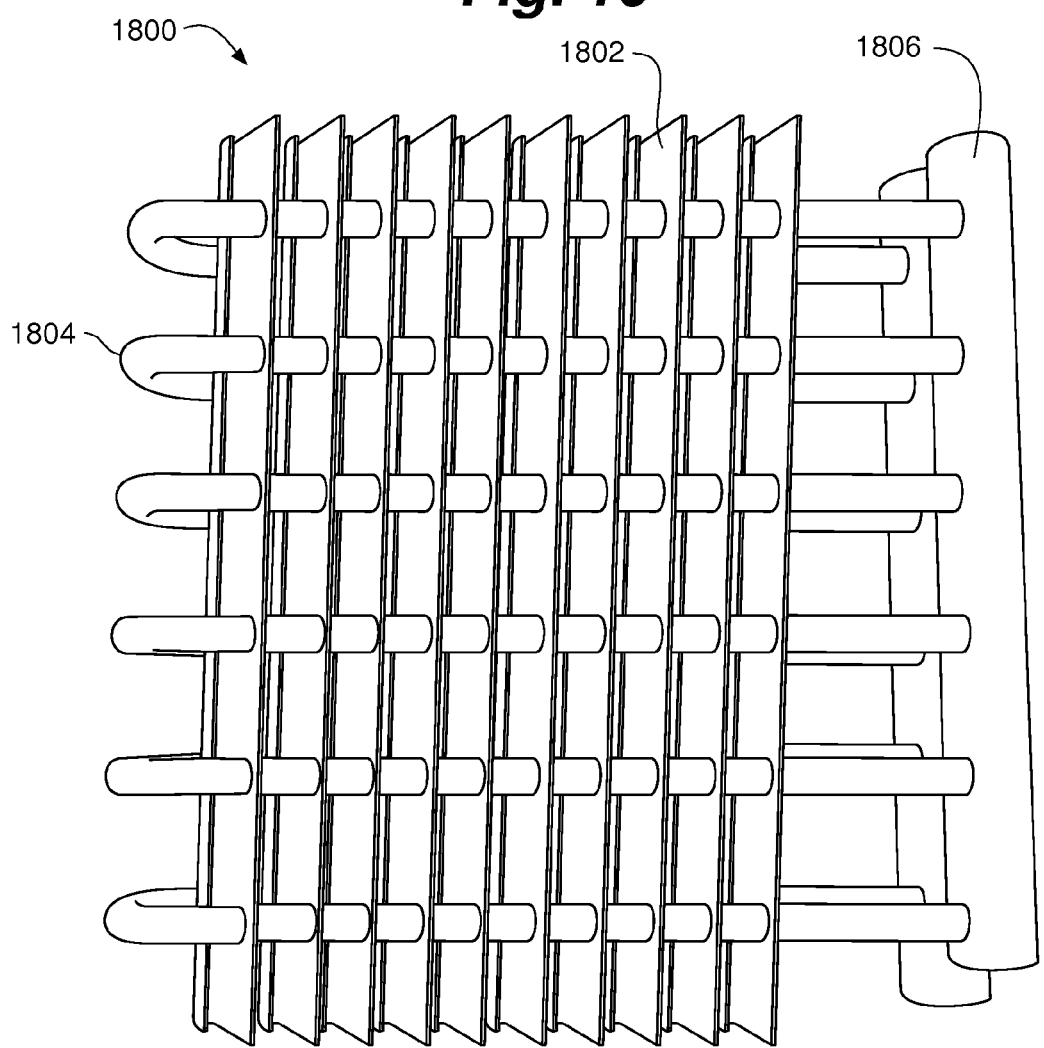
FIG. 16 is a side view of an air separator system, according to an embodiment.
Figure 17:
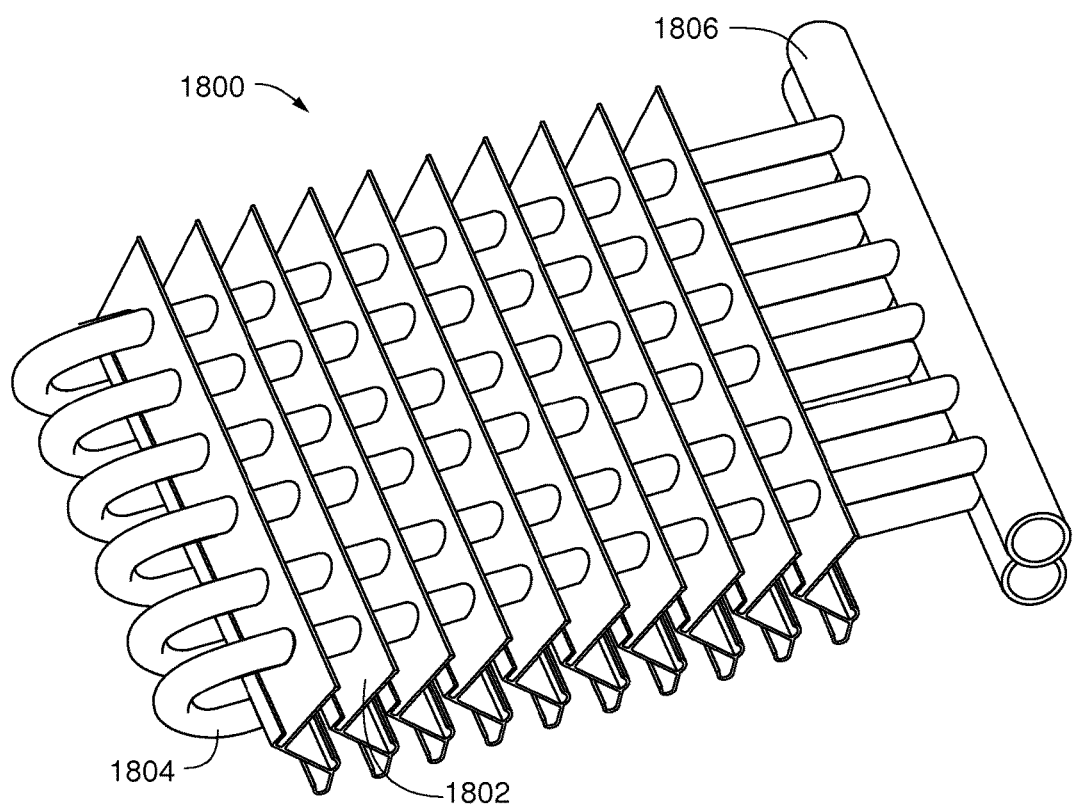
FIG. 17 is a perspective view of the air separator system of FIG. 16, according to an embodiment.

Referring to FIGS. 16-17, a side view and a perspective view of a separator system 1800 are respectively depicted, according to an embodiment. System 1800 generally comprises a plurality of vanes 1802, a plurality of coupling tubes 1804, and a manifold 1806. As depicted, coupling tubes 1804 are each continuous such that a continuous hollow portion of a single tube 1804 is looped or curved and presented through different apertures of the same vane 1802 and further coupled to manifold 1806. In operation, as described herein, manifold 1806 can be utilized to present fluid through the plurality of coupling tubes 1804.

Figure 18:
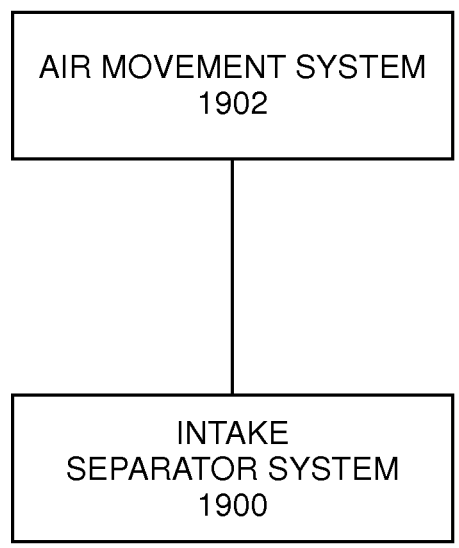
FIG. 18 is a block diagram of an air intake or exhaust separator system operably coupled to an air movement system, according to an embodiment of the invention.

Referring to FIG. 18, a block diagram of an air intake or exhaust separator system 1900 operably coupled to an air movement system 1902 is depicted. In an embodiment, air intake separator system 1900 protects air movement system 1902. For example, in embodiments, air movement system 1902 can comprise a generator, HVAC, ventilation, evaporator, absorber, gas scrubber, desulphurization unit, gas cooler, natural gas processing plant, exhaust air treatment plant, chemical plant, air handling unit, or evaporation system. Air intake separator system 1900 protects air movement system 1902 by providing a screen of vanes at a specific distance apart. In embodiments, air intake separator system 1900 is directly fastened or mounted to air movement system 1902. In other embodiments, air intake separator 1900 is placed distal or slightly distal from air movement system 1902 and fastened distal or slightly distal from air movement system 1902.

Figure 19A:
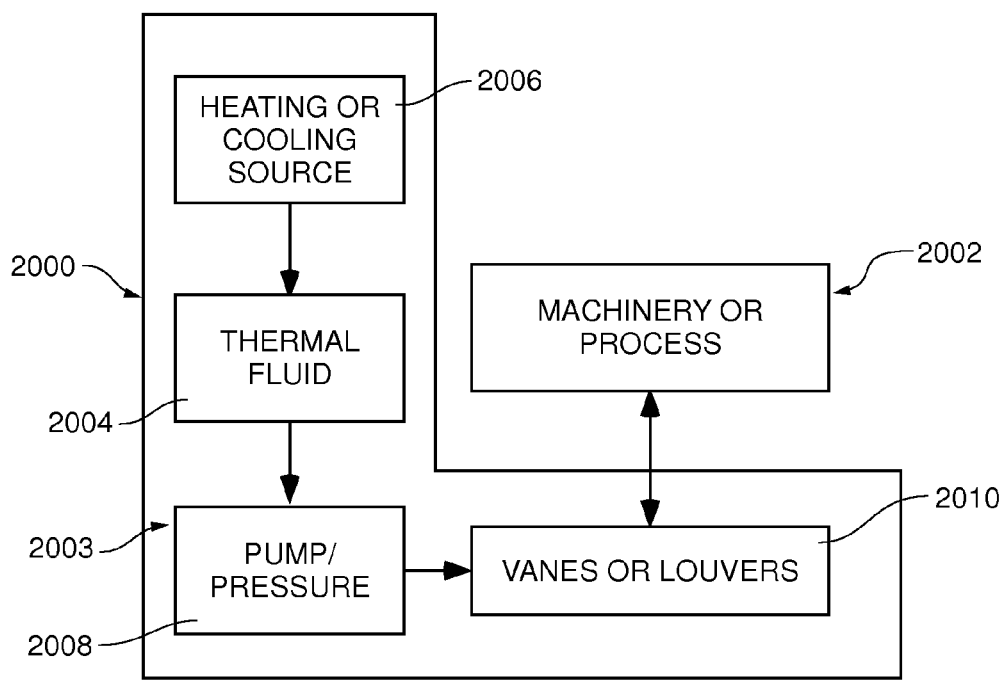
FIG. 19A is a block diagram of an air intake or exhaust separator system including a pump subsystem operably coupled to an air movement system, according to an embodiment of the invention.

Referring to FIG. 19A, a block diagram of an air intake or exhaust separator system 2000 operably coupled to an air movement system 2002 is depicted. In an embodiment, air intake or exhaust separator system 2000 generally comprises a pump subsystem 2003. In an embodiment, pump subsystem 2003 can comprise a fluid source 2004 and a heating/cooling element 2006 in combination with a pumping element 2008 configured to push fluid from fluid source 2004 through a plurality of vanes 2010 of air intake or exhaust separator system 2002. For example, a heat transfer fluid such as glycol can be sourced from fluid source 2004 and subsequently heated by heating element 2006. In another embodiment, air is pumped or runs through vanes 2010 and is heated or cooled depending on the performance desired. In such embodiments, air is considered a fluid and can be sourced from fluid source 2004.

Figure 19B:
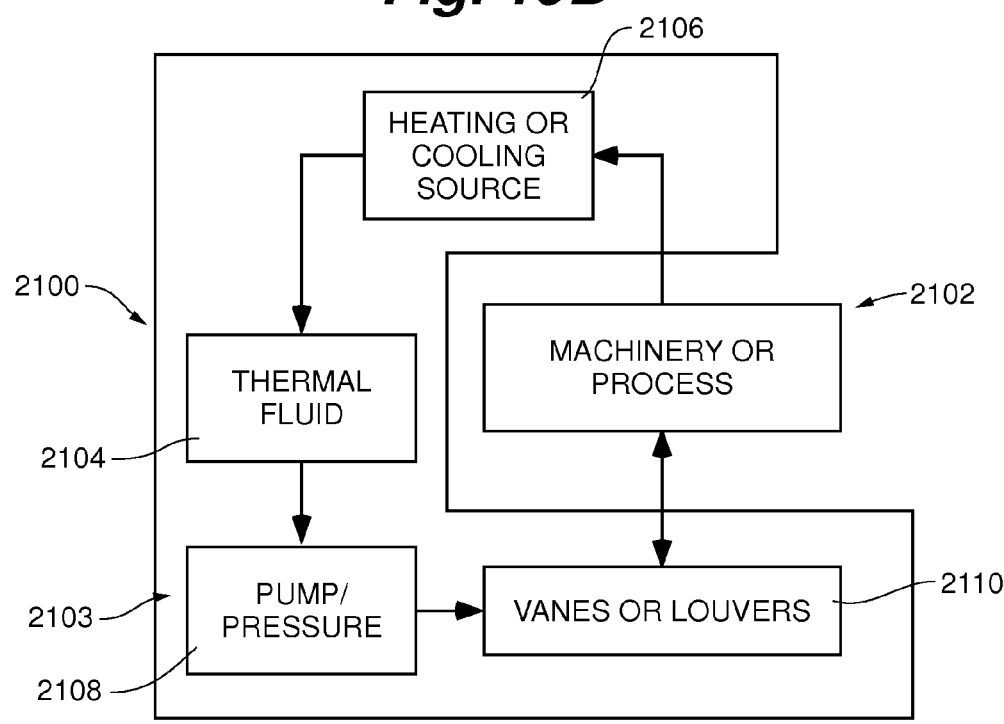
FIG. 19B is a block diagram of an air intake or exhaust separator system including a pump subsystem operably coupled to an air movement system, according to an embodiment of the invention.

Referring to FIG. 19B, a block diagram of an air intake or exhaust separator system 2100 operably coupled to an air movement system 2102 is depicted. In an embodiment, air intake or exhaust separator system 2100 generally comprises a pump subsystem 2103. In an embodiment, pump subsystem 2103 can comprise a fluid source 2104 and recovered heat from a process 2106, and a pumping element 2108 configured to push the fluid from fluid source 2104 through a plurality of vanes 2110 of air intake or exhaust separator system 2102. For example, a heat transfer fluid such as oil can be heated by process 2106 (for example, hot lube oil from a turbine). The "free" heat from the oil is therefore cooled by the routing through vanes 2110, at the same time preventing inlet icing and facilitating airstream temperature management. In another embodiment, heated air is pumped or runs through vanes 2110 and is heated. In such embodiments, air is considered a fluid and can be sourced from fluid source 2104. In embodiments, as depicted by the airflow annotations, airflow can be in either direction for both intake or exhaust.

Figure 19C:
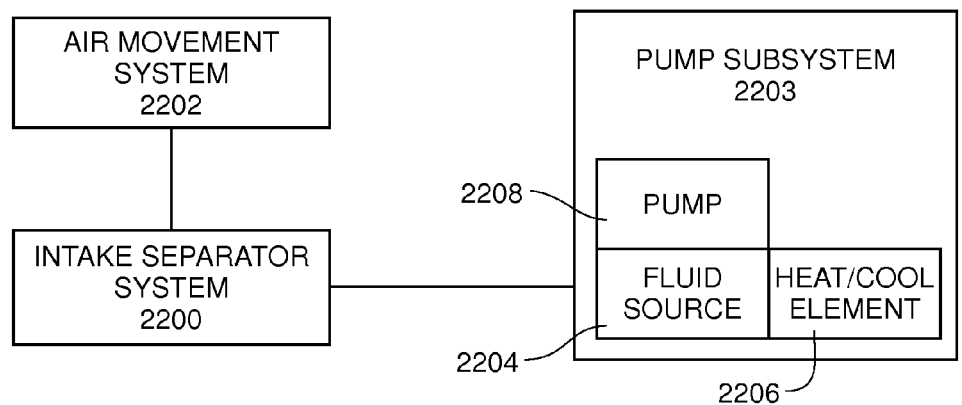
FIG. 19C is a block diagram of an air intake or exhaust separator system including a pump subsystem operably coupled to an air movement system, according to an embodiment of the invention.

Referring to FIG. 19C, a block diagram of an air intake or exhaust separator system 2200 operably coupled to an air movement system 2202 is depicted. In an embodiment, air intake or exhaust separator system 2200 can be operably coupled to a pump subsystem 2203. As depicted, pump subsystem 2203 is discrete from air intake or exhaust separator system 2200, in an embodiment. The coupling of pump subsystem 2203 and air intake or exhaust separator system 2200 can be electrical and/or mechanical, by electrical wiring and appropriate conduit to connect pump subsystem 2203 and air intake or exhaust separator system 2200. In other embodiments, pump subsystem 2203 is physically incorporated into air intake or exhaust separator system 2200.

In an embodiment, pump subsystem 2203 can comprise a fluid source 2204 and a heating/cooling element 2206, and a pumping element 2208 configured to pushing the fluid from fluid source 2204 through the vanes of air intake or exhaust separator system 2200 (not shown in FIG. 19C). For example, a heat transfer fluid such as glycol can be heated by heating element 2206. In another embodiment, air is pumped or runs through the vanes of air intake or exhaust separator system 2200 and is heated or cooled by heating/cooling element 2206 depending on the performance desired. In such embodiments, air is considered a fluid and can be sourced from fluid source 2204.

Figure 20:
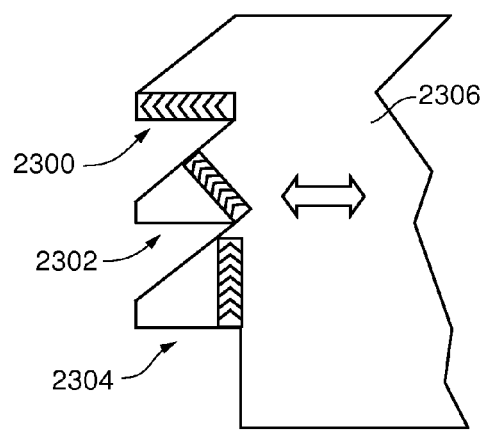
FIG. 20 is a schematic diagram of an air intake or exhaust separator system illustrating a horizontally-positioned vane pack, an angled vane pack, and a vertically-positioned vane pack, according to embodiments of the invention.

Referring to FIG. 20, a schematic diagram of an air intake or exhaust separator system illustrating a horizontally-positioned vane pack 2300, an angled vane pack 2302, and a vertically-positioned vane pack 2304, is depicted, according to embodiments of the invention. Horizontally-positioned vane pack 2300, angled vane pack 2302, and vertically-positioned vane pack 2304 are operably coupled or integrated into hood 2306. The arrows in FIG. 20 and subsequent figures illustrate air flow direction options. The relative angles of the respective vane pack positioning can have an impact on restriction and efficiency. In applications, one of horizontally-positioned vane pack 2300, angled vane pack 2302, or vertically-positioned vane pack 2304 can be utilized in pre-existing or new construction hoods. For example, a particular application can require a particular positioning of the separator system, such as horizontal, vertical, or any other angle. In embodiments, fluid is removed prior to a process. In other embodiments, fluid is removed after a process. The vanes can be located at an inlet or exhaust as depicted in hood 2306, but can also be located within process subsystems.

Figure 21:
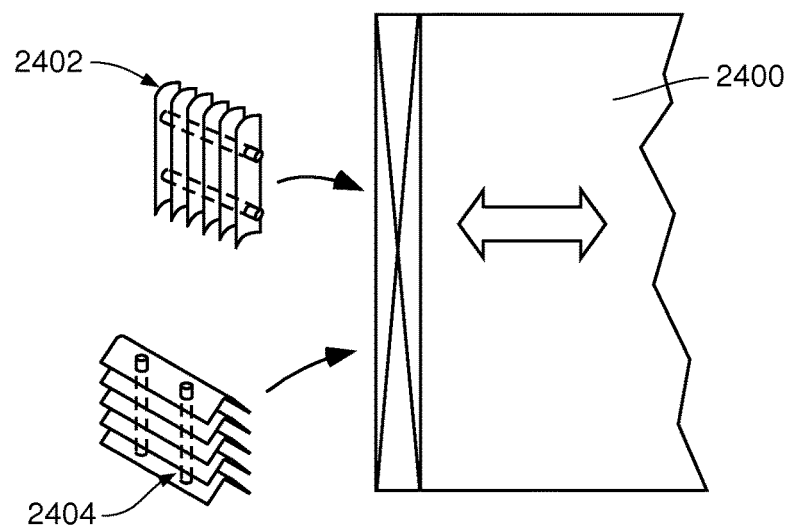
FIG. 21 is a schematic diagram of a hood including a plurality of air intake or exhaust separator systems, according to embodiments of the invention.

Referring to FIG. 21, a schematic diagram of a hood 2400 including a plurality of air intake or exhaust separator systems is depicted. Hood 2400 includes a first separator system 2402 and a second separator system 2404. As depicted, first separator system 2402 and second separator system 2404 can respectively be positioned at multiple angles ranging from vertical to horizontal, in embodiments. Vanes of first separator system 2402 and second separator system 2404 can be located at an inlet or exhaust, but could also be located within the process subsystems.

Figure 22:
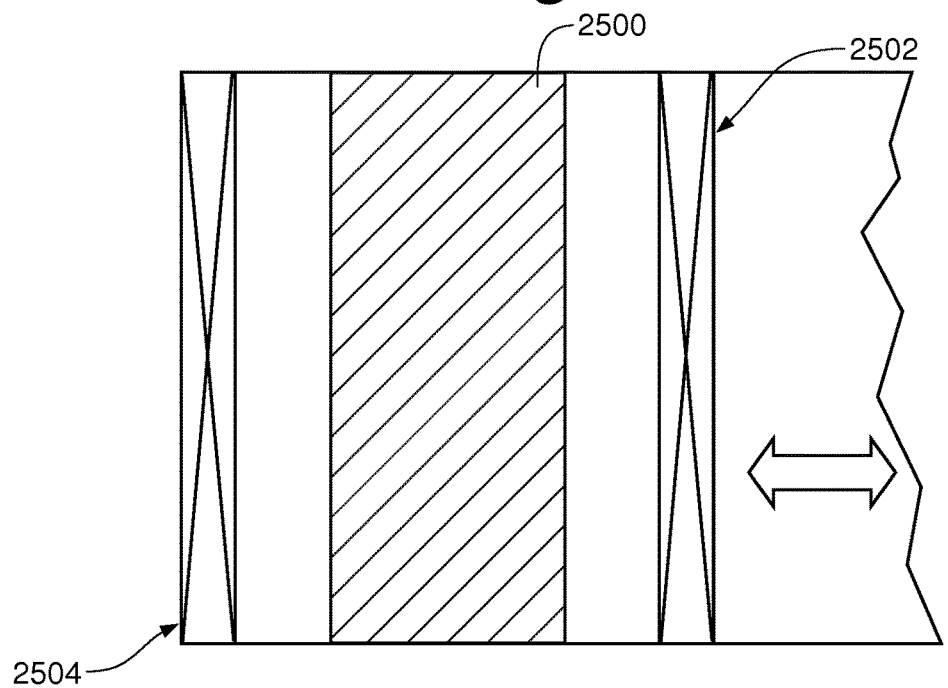
FIG. 22 is a schematic diagram of a duct having an air intake or exhaust separator system, according to embodiments of the invention.

Referring to FIG. 22, a schematic diagram of a duct 2500 having an air intake or exhaust separator system is depicted. In embodiments, an air separator system, or more particularly, the vanes of a separator system, can be located upstream or downstream in a duct or inlet. For example, a first separator system 2502 is mounted upstream in duct 2500. A second separator system 2504 is mounted downstream in duct 2500. In embodiments, only a single separator system can be utilized, either upstream or downstream.

Figure 23:
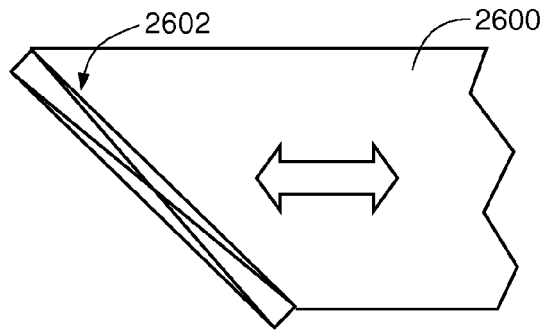
FIG. 23 is a schematic diagram of a duct having an air intake or exhaust separator system mounted at an angle, according to embodiments of the invention.

Referring to FIG. 23, a schematic diagram of a duct 2600 having an air intake or exhaust separator system 2602 mounted at an angle is depicted. In embodiments, air intake separator system 2602, or more particularly, vanes of separator system 2602, can be located upstream or downstream in a duct, inlet, or exhaust. Separator system 2602 is depicted as mounted at generally a 45 degree angle relative to duct 2600. However, in embodiments, separator system 2602 can be mounted less than or more than 45 degrees relative to duct 2600.

Figure 24:
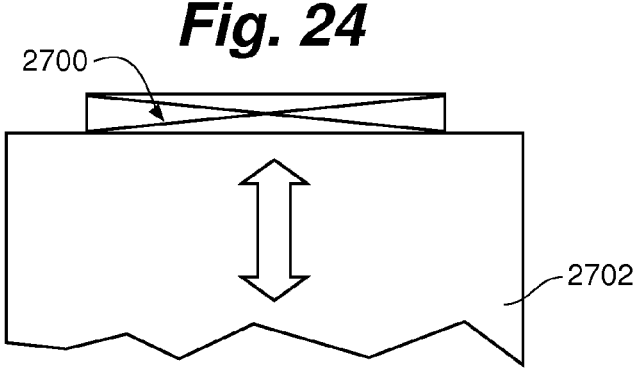
FIG. 24 is a schematic diagram of a top-mounted air intake or exhaust separator system, according to embodiments of the invention.

Referring to FIG. 24, a schematic diagram of a top-mounted air intake or exhaust separator system 2700 is depicted. In embodiments, top-mounted air intake separator system 2700, or more particularly, vanes of separator system 2700, can be mounted on a roof 2702, and can be located upstream or downstream in a duct, inlet, or exhaust.

Figure 25:
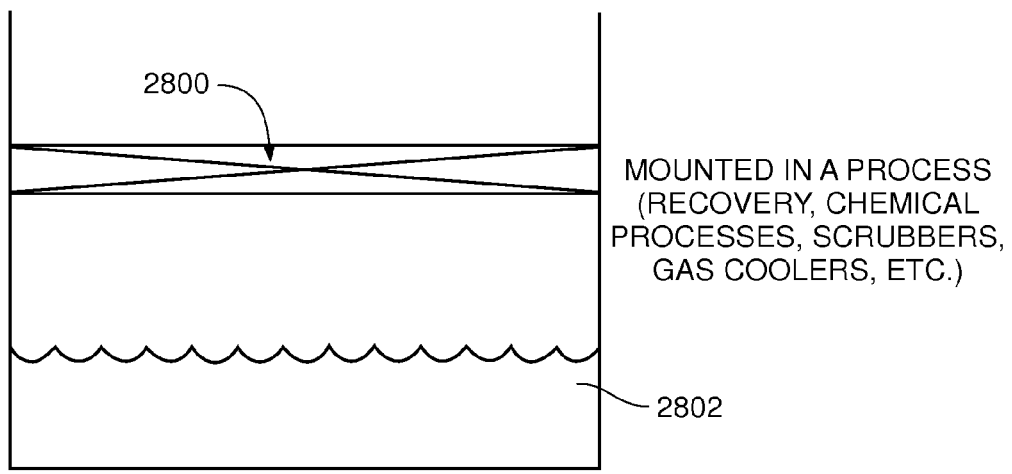
FIG. 25 is a schematic diagram of an air intake or exhaust separator system integrated into a process subsystem, according to embodiments of the invention.

Referring to FIG. 25, a schematic diagram of an air intake or exhaust separator system 2800 integrated into a process subsystem 2802 is depicted. In embodiments, air separator system 2800 can be integrated with any suitable recovery process subsystem 2802. For example, recovery process subsystem 2802 can comprise a chemical process subsystem, a scrubber process subsystem, or a gas cooler process subsystem. Separator system 2800 can similarly be incorporated into other subsystems. As such, separator system 2800 can be positioned proximate recovery process subsystem 2802.

Figure 26A:
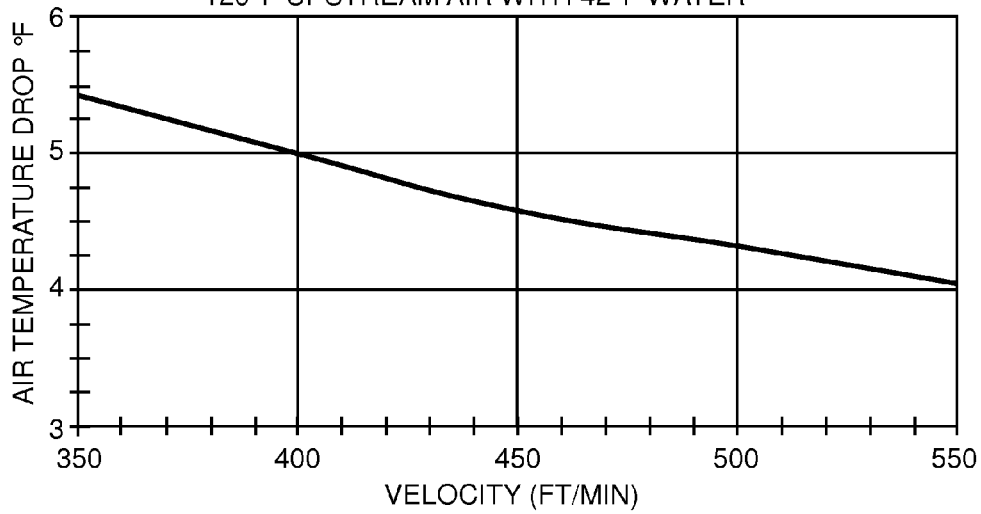
FIGS. 26A-26E are test data graphs for an air intake or exhaust separator system, according to an embodiment.
Figure 26B:
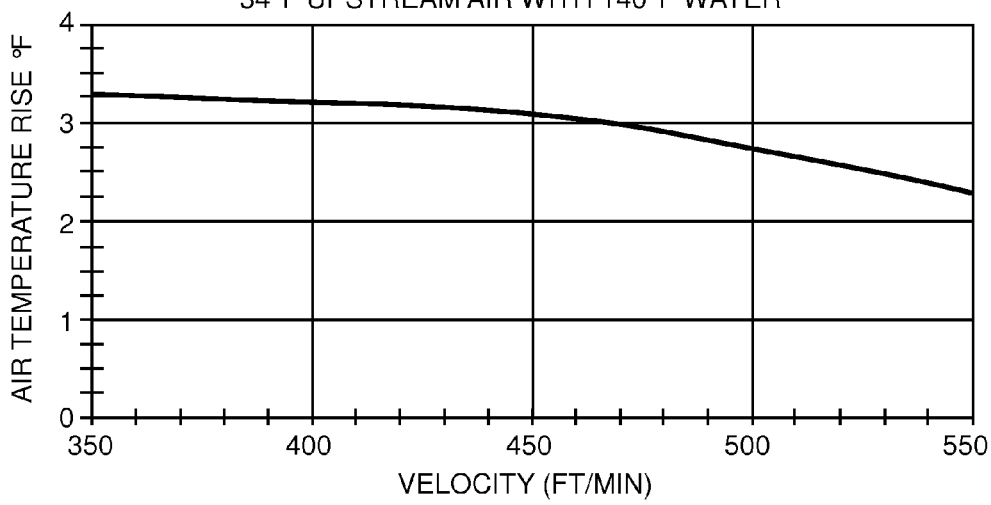
Figure 26C:
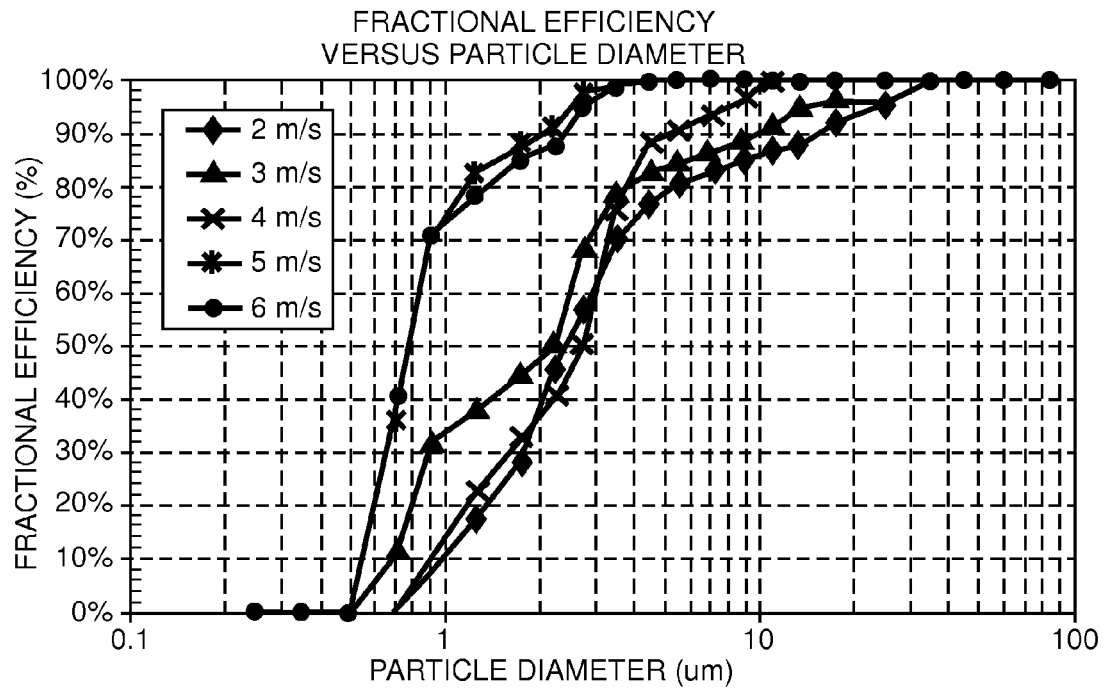
Figure 26D:
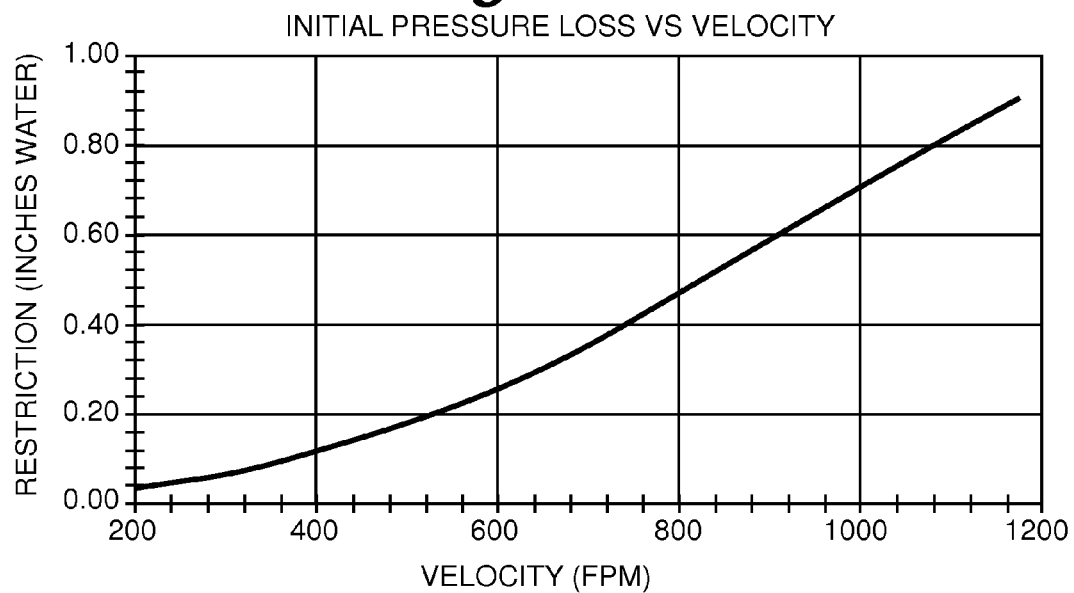
Figure 26E:
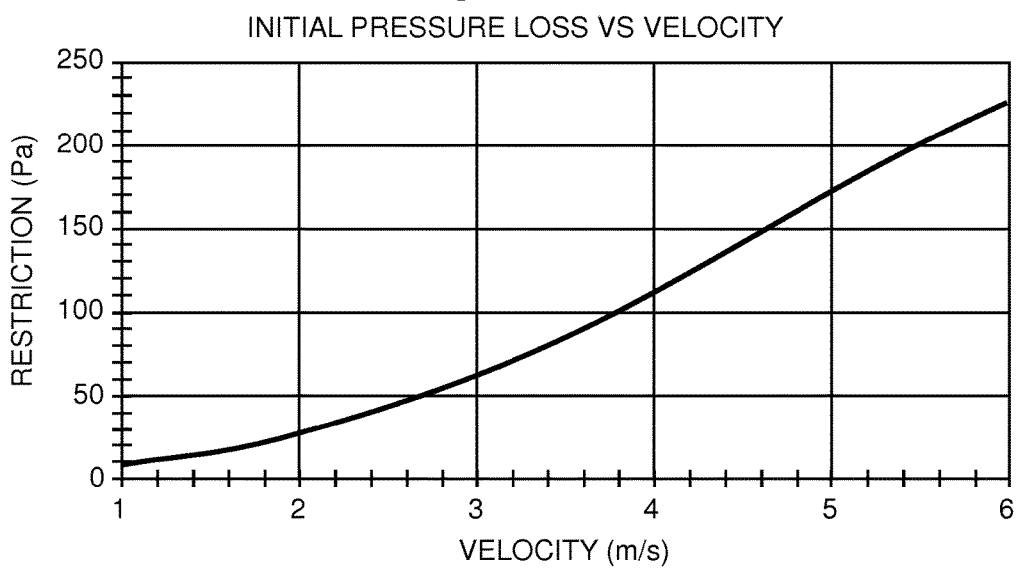

Referring to FIGS. 26A-26E, a set of test data graphs for an embodiment of an air intake or exhaust separator system is depicted. FIG. 26A depicts exemplary air temperature change vs. velocity for 120 degree F. upstream air with 42 degree F. water. FIG. 26B depicts exemplary air temperature change vs. velocity for 34 degree F. upstream air with 140 degree F. water. FIG. 26C depicts efficient water droplet removal, illustrating fractional efficiency vs. particle diameter. FIGS. 26D-26E depict low pressure loss as initial pressure loss vs. velocity. As shown by the test results of FIGS. 26A-26E, droplet catchers embodied by vanes of an embodiment create substantial turbulence that translates into substantial heat transfer. The actual measured thermal performance was approximately 40% better than the estimates made by estimating software from manufacturers of traditional standard coils. The test data graphs are illustrative of an embodiment, and are in no way limiting as to the scope of data corresponding to such embodiments.

Figure 27A:
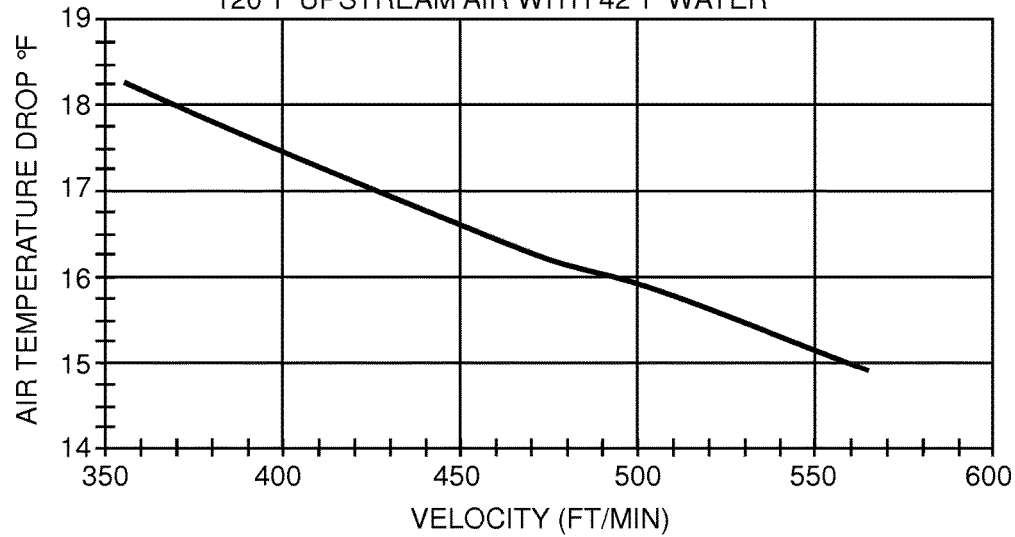
FIG. 27A-27E are test data graphs for an air intake or exhaust separator system, according to an embodiment.
Figure 27B:
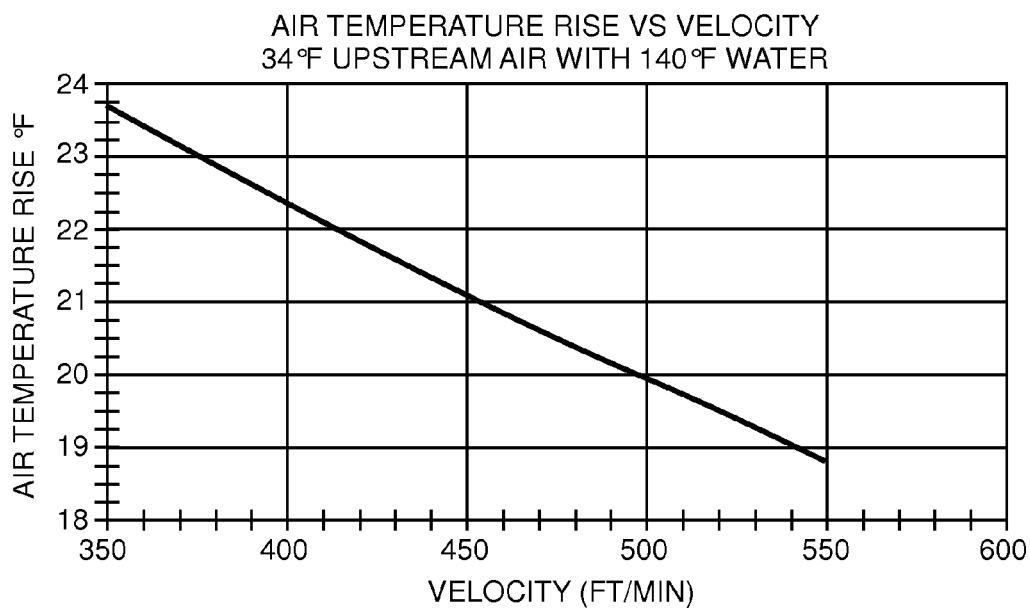
Figure 27C:
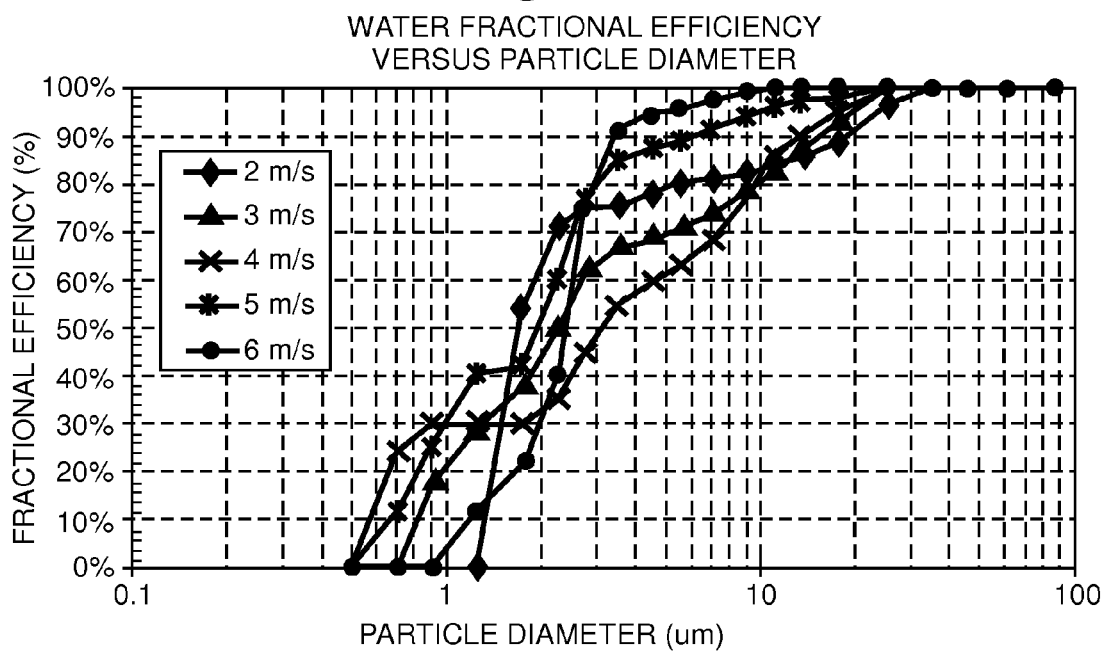
Figure 27D:
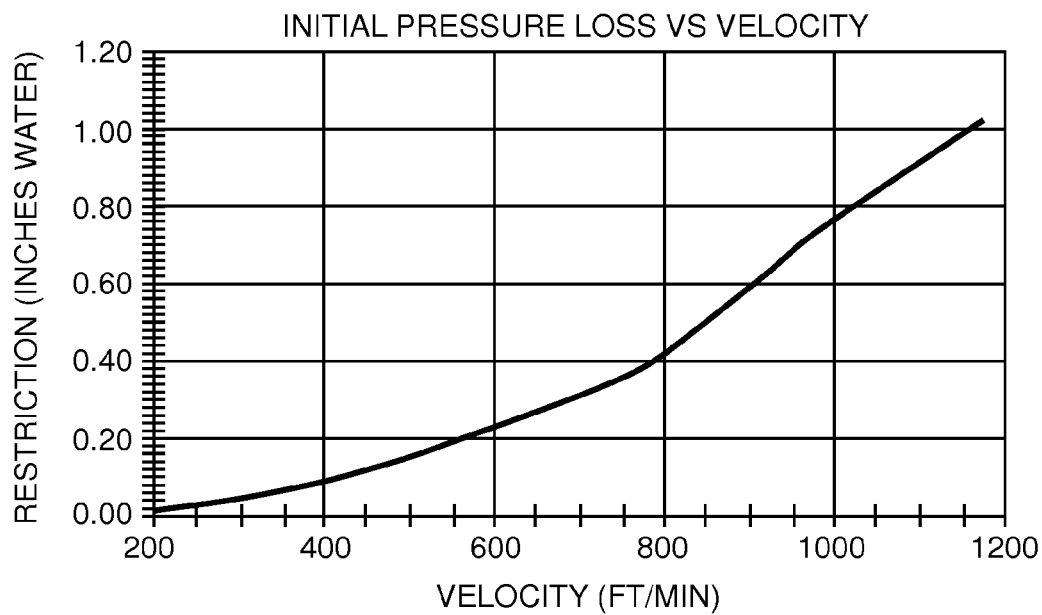
Figure 27E:
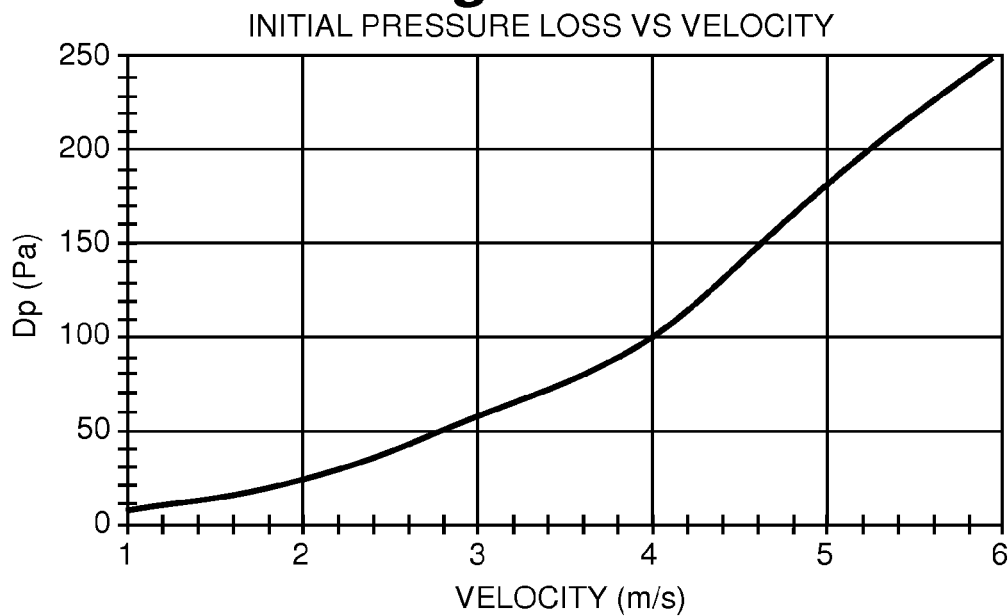

Referring to FIGS. 27A-27E, a set of test data graphs for an embodiment of an air intake or exhaust separator system is depicted. FIG. 27A depicts exemplary air temperature change vs. velocity for 120 degree F. upstream air with 42 degree F. water. FIG. 27B depicts exemplary air temperature change vs. velocity for 34 degree F. upstream air with 140 degree F. water. FIG. 27C depicts efficient water droplet removal, illustrating fractional efficiency vs. particle diameter. FIGS. 27D-27E depict low pressure loss as initial pressure loss vs. velocity. As shown by the test results of FIGS. 27A-27E, droplet catchers embodied by vanes of an embodiment create substantial turbulence that translates into substantial heat transfer. The actual measured thermal performance was approximately 40% better than the estimates made by estimating software from manufacturers of traditional standard coils. The test data graphs are illustrative of an embodiment, and are in no way limiting as to the scope of data corresponding to such embodiments.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. An air handling separator comprising:
a plurality of vanes, each vane having at least one aperture, wherein each vane is positioned substantially parallel to and spaced apart from the other of the plurality of vanes, and wherein the plurality of vanes are configured to reduce fluid from an air stream passing through the air handling separator;
wherein each of the plurality of vanes comprises a vertex. a first extending portion. and a second extending portion, wherein the first extending portion and the second extending portion extend from the vertex at an angle:
wherein each of the plurality of vanes comprises a first aperture and a second aperture, and wherein at least one coupling tube passes through the first aperture and the second aperture: wherein a first plurality of vanes are spaced according to a first spacing. and a second plurality of vanes are spaced according to a second spacing, wherein the first spacing and the second spacing are different; the
at least one coupling tube comprising an outer tube wall and a hollow void and configured to be inserted through the at least one aperture of each of the plurality of vanes,
wherein the coupling tube creates a fluid path to improve heating or cooling performance: and
wherein an interference fit between the at least one coupling tube and the plurality of vanes retains the plurality of vanes, wherein the interference fit mechanically locks a particular vane in place absent any spacers separating the plurality of vanes.

2. The air handling separator of claim 1, wherein expanding includes at least one of:
presenting fluid through the at least one coupling tube to hydraulically pressurize the at least one coupling tube,
constricting the at least one coupling tube by a vacuum prior to an insertion of the at least one coupling tube through the aperture, wherein expanding the at least one coupling tube comprises releasing the vacuum when the plurality of vanes are in a desired position,
presenting a projectile through the at least one coupling tube, the projectile comprising solid or semi-solid material, or
heating at least one of the plurality of vanes prior to an insertion of the at least one coupling tube through the aperture of the at least one of the plurality of vanes, and chilling the at least one coupling tube prior to the insertion of the at least one coupling tube through the aperture, and normalizing the temperatures of the at least one of the plurality of vanes and the at least one coupling tube.

3. A system for air handling comprising:
an air movement system configured to generate an air stream; and
an air handling separator operably coupled to the air movement system such that the air stream passes through the air handling separator, the air handling separator comprising:
a plurality of vanes, each vane having at least one aperture, wherein each vane is positioned substantially parallel to and spaced apart from the other of the plurality of vanes, and wherein the plurality of vanes are configured to reduce fluid from the air stream;
wherein each of the plurality of vanes comprises a vertex, a first extending portion and a second extending portion. wherein the first extending portion and the second extending portion extend from the vertex at an angle:
wherein each of the plurality of vanes comprises a first aperture and a second aperture, and wherein at least one coupling tube passes through the first aperture and the second aperture,
wherein a first plurality of vanes are spaced according to a first spacing, and a second plurality of vanes are spaced according to a second spacing, wherein the first spacing and the second spacing are different;
the at least one coupling tube comprising an outer tube wall and a hollow void and configured to be inserted through the at least one aperture of each of the plurality of vanes, wherein the coupling tube creates a fluid path to improve heating or cooling performance; and wherein an interference fit between the at least one coupling tube and the plurality of vanes retains the plurality of vanes, wherein the interference fit mechanically locks a particular vane in place absent any spacers separating the plurality of vanes.

4. The system for air handling of claim 3, further comprising:
a pump subsystem operably coupled to the air handling separator, the pump subsystem comprising:
a pump;
a fluid source including fluid; and
a heater-cooler configured to apply a heating or cooling temperature to the fluid,
wherein the pumping mechanism is configured to pump the fluid through the at least one coupling tube to apply the temperature to the plurality of vanes to heat or cool the air stream.

5. The system for air handling of claim 4, wherein the heater-cooler is an output of the air movement system.

6. The system for air handling of claim 3, wherein the plurality of vanes are mounted according to at least one of a horizontal position relative to the direction of an air stream from the air movement system, an angled position relative to the direction of the air stream from the air movement system, and a vertical position relative to the direction of the air stream from the air movement system.

* * * * *